(12) United States Patent
Barton et al.

(10) Patent No.: US 10,406,750 B2
(45) Date of Patent: Sep. 10, 2019

(54) FIBER-REINFORCED 3D PRINTING

(71) Applicant: The Regents of the University of Michigan, Ann Arbor, MI (US)

(72) Inventors: Kira Barton, Ann Arbor, MI (US); Sunil Kapila, Greenbrae, CA (US); Lai Yu Leo Tse, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 6 days.

(21) Appl. No.: 15/669,441

(22) Filed: Aug. 4, 2017

(65) Prior Publication Data

US 2018/0036946 A1 Feb. 8, 2018

Related U.S. Application Data

(60) Provisional application No. 62/370,936, filed on Aug. 4, 2016.

(51) Int. Cl.
*B29C 64/165* (2017.01)
*B29C 64/209* (2017.01)
(Continued)

(52) U.S. Cl.
CPC .......... *B29C 64/165* (2017.08); *B29C 64/118* (2017.08); *B29C 64/209* (2017.08);
(Continued)

(58) Field of Classification Search
CPC ... B29C 64/165; B29C 64/118; B29C 64/209; B29C 64/336; B29C 70/205;
(Continued)

(56) References Cited

U.S. PATENT DOCUMENTS

| 6,054,003 A | 4/2000 | Bak et al. |
| 2014/0328963 A1 | 11/2014 | Mark et al. |
| 2016/0144567 A1 | 5/2016 | Müller et al. |

FOREIGN PATENT DOCUMENTS

| CN | 104097326 A | 10/2014 |
| JP | H09-088505 A | 5/1997 |

OTHER PUBLICATIONS

Greer, C. et al., "Processing of Carbon Fiber Reinforced Composites by Three Dimensional Photolithography", In Proc. Solid Freeform Fabrication Symposium, pp. 307-311, 1996.
(Continued)

*Primary Examiner* — Camie S Thompson
(74) *Attorney, Agent, or Firm* — Reising Ethington P.C.

(57) ABSTRACT

A 3D printing system configured to embed and orient reinforcing fibers in a printable matrix material in at least three directions, wherein at least one of the directions is non-parallel with a plane defined by two other of the directions. The 3D printing system may be configured to deposit a layer of printable non-metallic material along a printing path on a contoured printing surface to form a 3D printed article. The system can carry out a method of 3D printing a fiber-reinforced article that includes the steps of: depositing a plurality of layers of printable matrix material one over another to define a three-dimensional shape of the article; and embedding a reinforcing fiber in the printable matrix material during the step of depositing, with the reinforcing fiber extending into more than one of the plurality of material layers.

20 Claims, 17 Drawing Sheets

(51) Int. Cl.
| | |
|---|---|
| B33Y 30/00 | (2015.01) |
| B33Y 70/00 | (2015.01) |
| B33Y 10/00 | (2015.01) |
| B29C 64/118 | (2017.01) |
| B29C 64/336 | (2017.01) |
| B29C 70/38 | (2006.01) |
| B29C 70/20 | (2006.01) |
| B29K 67/00 | (2006.01) |
| B29K 307/04 | (2006.01) |

(52) U.S. Cl.
CPC .......... *B29C 64/336* (2017.08); *B29C 70/205* (2013.01); *B29C 70/382* (2013.01); *B33Y 10/00* (2014.12); *B33Y 30/00* (2014.12); *B33Y 70/00* (2014.12); *B29K 2067/046* (2013.01); *B29K 2307/04* (2013.01)

(58) Field of Classification Search
CPC . B29C 70/382; B29C 70/00; B29K 2067/046; B29K 2307/04; B33Y 30/00; B33Y 70/00
USPC ...................................................... 428/292.1
See application file for complete search history.

(56) References Cited

OTHER PUBLICATIONS

Kruth, J. P. et al., "Progress in Additive Manufacturing and Rapid Prototyping", CIRP Annals-Manufacturing Technology, vol. 47, No. 2, pp. 525-540, 1998.

Gupta, A. et al., "Dual Curing of Carbon Fiber Reinforced Photoresins for Rapid Prototyping", Polymer Composites, vol. 23, No. 6, pp. 1162-1170, Dec. 2002.

Karalekas, D.E. "Study of The Mechanical Properties of Nonwoven Fibre Mat Reinforced Photopolymers Used in Rapid Prototyping", Materials & Design, vol. 24, No. 8, pp. 665-670, Mar. 2003.

Karalekas, D. et al., "Composite Rapid Prototyping: Overcoming the Drawback of Poor Mechanical Properties", Journal of Materials Processing Technology, vol. 153, 526-530, 2004.

Kumar, S. et al., "Composites by Rapid Prototyping Technology", Materials & Design, vol. 31, No. 2, 23 pages, Feb. 4, 2009.

Mark, G, "3D Printing of Carbon Fiber Reinforced Polymer", available at https://markforged.com/materials/composites, 9 pages, Jan. 2015.

Sher, D, "ColorFabb Releases Advanced Carbon Fiber Composite 3D Printing Filament", available at http://3dprintingindustry.com/2015/02/04/colorfabb-releases-new-xt-cf20-composite-carbon-fiber-material/, 3 pages, dated Feb. 4, 2015.

Grunewald, S, "3D Printing with Platinum Glass Achieved", available at https://3dprintingindustry.com/news/3d-printing-platinum-glass-tanaka-holdings-37115/, 2 pages, dated Nov. 26, 2014.

Klein, S. et al., "3D Printing of Transparent Glass", HP Laboratories, 4 pages, 2012.

Zhu, W. et al., "A Novel Method Based on Selective Laser Sintering for Preparing High-performance Carbon Fibres/Polyamide12/Epoxy Ternary Composites", Scientific Reports, 10 pages, dated Sep. 21, 2016.

K. V. Wong et al., International Scholarly Research Network, "A Review of Additive Manufacturing", ISRN Mechanical Engineering, 11 pages, dated Jun. 2012.

S. H. Huang et al., "Additive Manufacturing and its Societal Impact: A Literature Review", The International Journal of Advanced Manufacturing Technology, vol. 67, pp. 1191-1203, dated Jul. 2013.

W. E. Frazier, "Metal Additive Manufacturing: A Review", Journal of Materials Engineering and Performance, vol. 23 No. 6, pp. 1917-1928, dated Apr. 2014.

I. Gibson et al., Johnson Matthey Technology Review, "Additive Manufacturing Technologies: 3D Printing, Rapid Prototyping, and Direct Digital Manufacturing", Springer Science and Business Media, vol. 59, No. 3, pp. 193-198, dated 2015.

S. H. Ahn et al., "Polycaprolactone Scaffolds Fabricated with an Advanced Electrohydrodynamic Direct-Printing Method for Bone Tissue Regeneration", Biomacromolecules, vol. 12, 8 pages, dated Nov. 2011.

S. Das et al., "Freeform Fabrication of Nylon-6 Tissue Engineering Scaffolds", Rapid Prototyping Journal, vol. 9, No. 1, pp. 43-49, dated Mar. 2003.

P. Liacouras et al., "Designing and Manufacturing an Auricular Prosthesis Using Computed Tomography, 3-Dimensional Photographic Imaging, and Additive Manufacturing: A Clinical Report", Journal of Prosthetic Dentistry, vol. 105, No. 2, pp. 78-82, Feb. 2011.

A. Grzesiak et al., "The Bionic Handling Assistant: A Success Story of Additive Manufacturing", Assembly Automation, vol. 31, No. 4, pp. 329-333, dated Sep. 2011.

D. Hull et al., "An introduction to composite materials", Cambridge University Press, 1 page, dated in 1996.

B. G. Compton et al., "3D-Printing of Lightweight Cellular Composites", Advanced Materials, vol. 26, No. 34, pp. 5930-5935, dated Sep. 2014.

U.S. Environmental Protection Agency, "EPA and NHTSA Set Standards to Reduce Greenhouse Gases and Improve Fuel Economy for Model Years 2017-2025 Cars and Light Trucks", accessed at www.epa.gov/otaq/climate/documents/420f12051.pdf, 10 pages, Aug. 2012.

Deptartment of Transportation, National Highway Traffic Safety Administration 49 CFR Part 575, "New Car Assessment Program", vol. 78, No. 66, accessed at www.gpo.gov/fdsys/pkg/FR-2013-04-05/html/2013-07766.htm, 17 pages, dated Apr. 2013.

L. M. Sherman, Plastics Technology, "What's New at the Show in PUR/RIM", accessed at www.ptonline.com/articles/what's-new-at-the-show-in-pur-rim, 4 pages, dated Sep. 2007.

A. Brecher et al., "Characterizing and Enhancing the Safety of Future Plastic and Composite Intensive Vehicles (PCIVs)", accessed at www-nrd.nhtsa.dot.gov/pdf/esv/esv21/09-0316.pdf, 9 pages, dated in 2009.

D. Sedgwick, Automotive News, "New techniques cut cost of carbon fiber", accessed at www.autonews.com/article/20110711/OEM01/307119988/new-techniques-cut-cost-of-carbon-fiber, 3 pages, dated Jul. 2011.

T. Dunne, J.D. Power Global Automotive Blog, "One-Third of Vehicle Mix to Feature Alternative Powertrains in 2025", accessed at jdpowercontent.com/globalauto/one-third-of-vehicle-mix-to-feature-alternative-powertrains-n-2025/2013/04/291, 1 page, dated Apr. 29, 2013.

International Committee of the Red Cross's Physical Rehabilitation Programme, "Knee-Ankle-Foot Orthosis: Manufacturing Guidelines", 20 pages, dated Sep. 2006.

S. J. Lochner et al., "Simulation Methods in the Foot Orthosis Development Process," Computer-Aided Design and Applications, vol. 11, No. 6, pp. 608-616, dated Jun. 2014.

M. C. Faustini et al., "Manufacture of Passive Dynamic Ankle—Foot Orthoses Using Selective Laser Sintering", IEEE Transactions on Biomedical Engineering, vol. 55, No. 2, pp. 784-790, dated Feb. 2008.

C. Mavroidis et al., "Patient Specific Ankle-foot Orthoses Using Rapid Prototyping", Journal of Neuroengineering and Rehabilitation, vol. 8, No. 1, 11 pages, dated Jan. 2011.

J. A. Owusu et al., "Update of Patient-specific Maxillofacial Implant.," Current Opinion in Otolaryngology and Head and Neck Surgery, vol. 23, No. 4, pp. 261-264, dated Aug. 2015.

A. L. Jardini et al., "Cranial Reconstruction: 3D Biomodel and Custom-built Implant Created Using Additive Manufacturing", Journal of Cranio-Maxillofacial Surgery, vol. 42, No. 8, pp. 1877-1884, dated Dec. 2014.

K. C. Wong et al., "One-step Reconstruction with a 3D-printed, Biomechanically Evaluated Custom Implant After Complex Pelvic Tumor Resection", Computer Aided Surgery, vol. 20, No. 1, pp. 14-23, dated Jan. 2015.

J. Chen et al., "Design and Manufacture of Customized Dental Implants by Using Reverse Engineering and Selective Laser Melting Technology", The Journal of Prosthetic Dentistry, vol. 112, No. 5, pp. 1088-1095, Nov. 2014.

(56) References Cited

OTHER PUBLICATIONS

G. Gagg et al., "Effects of Sintering Temperature on Morphology and Mechanical Characteristics of 3D Printed Porous Titanium Used as Dental Implant", Materials Science and Engineering C, vol. 33, No. 7, pp. 3858-3864, dated Oct. 2013.
N. Xu et al., "Reconstruction of the Upper Cervical Spine Using a Personalized 3D-Printed Vertebral Body in an Adolescent with Ewing Sarcoma", Spine, vol. 41, No. 1, pp. E50-4, Jan. 2016.
N. E. Fedorovich et al., "Biofabrication of Osteochondral Tissue Equivalents by Printing Topologically Defined, Cell-laden Hydrogel Scaffolds", Tissue Engineering Part C Methods, vol. 18, No. 1, pp. 33-44, dated Sep. 2012.
C. G. Jeong, and A. Atala, "3D Printing and Biofabrication for Load Bearing Tissue Engineering", Springer International Publishing Switzerland, vol. 881, pp. 3-14, dated in 2015.
T. Xu et al., "Hybrid Printing of Mechanically and Biologically Improved Constructs for Cartilage Tissue Engineering Applications". Biofabrication, vol. 5, No. 1, 12 pages, Nov. 2013.
F. Obregon et al., "Three-Dimensional Bioprinting for Regenerative Dentistry and Craniofacial Tissue Engineering", Journal of Dental Research, vol. 94, N. 9, pp. 143S-152S, dated Jun. 2015.
J. H. Park et al., "A Novel Tissue-Engineered Trachea with a Mechanical Behavior Similar to Native Trachea", Biomaterials, vol. 62, pp. 106-115, dated Sep. 2015.
J. Visser et al., "Reinforcement of Hydrogels Using Three-Dimensionally Printed Microfthers", Nature Communications, vol. 6, 10 pages, dated Apr. 2015.
International Search Report for International application No. PCT/US2017/045570, dated Aug. 4, 2017, 4 pages.
Written Opinion on International application No. PCT/US2017/045570, dated Aug. 4, 2017, 8 pages.

FIBER-REINFORCED 3D PRINTING

TECHNICAL FIELD

The present disclosure relates generally to 3D printing and, more particularly, to 3D printing objects with composite materials.

BACKGROUND

Additive manufacturing (AM) is a manufacturing technique that includes continuously attaching small quantities of material at precisely controlled locations, allowing the fabrication of intricate geometries from polymeric, metallic, ceramic, and/or biological tissues and materials. Unlike many traditional manufacturing techniques, AM processes do not require templates, molds, or masks, nor do they necessarily require removal and/or disposal of unwanted material to achieve the desired shape. Instead, an AM process distributes material at specific locations and facilitates unique part shapes and designs with time and cost savings, particularly for small- to medium-scale production. Additionally, AM processes have the ability to fabricate interlocking geometries, features embedded within a shell structure, and heterogeneously printed materials within a single layer or design, facilitating new designs and functionalities. 3D printing is one type of AM process.

Polymer inks were among the first materials used in AM for prototyping functional devices. Advancements in polymer material properties and AM processing capabilities have led to 3D printing of flexible polymers such as polycaprolactone (PCL) or polyamide (i.e., nylon), resulting in lightweight and geometrically customized parts such as prosthetic limbs and robotic frames, for example. Despite the advantages in customization provided by AM processes in such applications, the tensile, compressive, and bending strengths of polymeric materials are significantly lower than that of typical metal materials and/or insufficient for optimal component function in these and other applications.

Fiber-reinforced polymers (FRPs) are composite materials that combine polymeric materials with fibers. Carbon fibers are used to form carbon fiber-reinforced polymers (CFRPs). FRPs can be made with a higher tensile strength, stiffness, and/or strength-to-weight ratio than unreinforced polymers. Conventional FRP parts are fabricated via traditional approaches that include stacking layers of fibers and polymer together on a mold or template and curing the polymer via thermal or chemical means to adhere the different layers together. This can produce FRP parts with significant increases in strength compared to unreinforced polymers, particularly along the lengthwise direction of the fibers. One application for FRPs is shell-structures in automotive applications. However, despite the advantages of FRP in structural strength for such applications, conventional FRP fabrication processing is time-consuming, expensive, and inflexible to design changes; for example, a new and different mold is needed for each change in part design or for each differently shaped part.

Attempts to take advantage of the design flexibility of AM processes using FRPs have been met with limited success. Some parts fabricated via 3D printing of a mixture of polymer and short reinforcing fibers in a fused deposition modeling (FDM) process result in parts with weak physical bonding among the short fibers in the fabricated part. Fibers that are sufficiently short to be compatible with the FDM process do not significantly reinforce the polymer. Such fibers lack any controlled orientation and continuity against stress and strain.

In a modification of FDM, alternating layers of polymer and continuous fiber can be printed to form a continuous-fiber FRP part. In this approach, a layer of polymer is printed via conventional FDM, in which the polymer source material is melted prior to being deposited onto a substrate surface from a nozzle. Following the deposition of each polymer layer, strands of continuous fiber are placed onto the melted polymer surface. The process can be repeated to form a part with continuous fiber reinforcements in the polymer. The process requires at least one layer of polymer to be deposited prior to the fiber strands and is limited to deposition of planar polymer layers and in-plane 2D fiber orientation, offering no strength improvement in out-of-plane directions.

SUMMARY

In accordance with an aspect of the invention, there is provided a 3D printing system configured to embed and orient reinforcing fibers in a printable matrix material in at least three directions, wherein at least one of the directions is non-parallel with a plane defined by two other of the directions.

In accordance with another aspect of the invention, there is provided a 3D printing system configured to deposit a layer of printable material along a printing path on a contoured printing surface to form a 3D printed article, wherein the material comprises a non-metallic material.

In accordance with another aspect of the invention, there is provided a method of 3D printing a fiber-reinforced article, comprising the steps of: depositing a plurality of layers of printable matrix material one over another to define a three-dimensional shape of the article; and embedding a reinforcing fiber in the printable matrix material during the step of depositing, wherein the reinforcing fiber extends into more than one of the plurality of material layers.

In accordance with yet another aspect of the invention, there is provided a method of 3D printing an article, comprising the step of depositing a layer of printable material along a non-planar printing path, wherein the printable material comprises a non-metallic material. The method may further comprise the step of embedding a reinforcing fiber in the printable material along the non-planar printing path, whereby the article is a fiber-reinforced article.

In accordance with another aspect of the invention, there is provided a 3D printed article, comprising: a plurality of layers of printable matrix material, each layer being fused to an adjacent layer; and a plurality of reinforcing fibers embedded in the printable matrix material, at least one of the reinforcing fibers extending into more than one of the plurality of layers of printable matrix material. In some embodiments, at least one of the reinforcing fibers is a continuous reinforcing fiber.

In accordance with another aspect of the invention, there is provided a 3D printed article comprising a fiber mesh comprising arrays of parallel fibers oriented in three different directions, one of the directions being non-parallel with the other two directions.

In accordance with yet another aspect of the invention, there is provided a method of 3D printing a composite article, comprising the step of depositing composite material comprising a first material and a different second material on a printing surface along a printing path, wherein each of the materials is in continuous form and deposited together along the printing path and the first material is at least partly embedded in the second material during the step of depositing. Different embodiments of this method may include one or more of the additional features, taken singly or in any feasible combination:

the first material is at least partly embedded in the second material both before and after the step of depositing;
the first and second materials are arranged coaxially;
the composite article is a fiber-reinforced article;
the step of depositing comprises co-depositing a core and a co-axial coating, the core comprising a fiber formed from the first material, and the coating comprising the second material;
the first material has a higher tensile strength than the second material;
the second material is a polymeric material;
the first material is non-polymeric; and
the printing surface is non-planar.

DETAILED DESCRIPTION OF EMBODIMENTS

Figure 1:
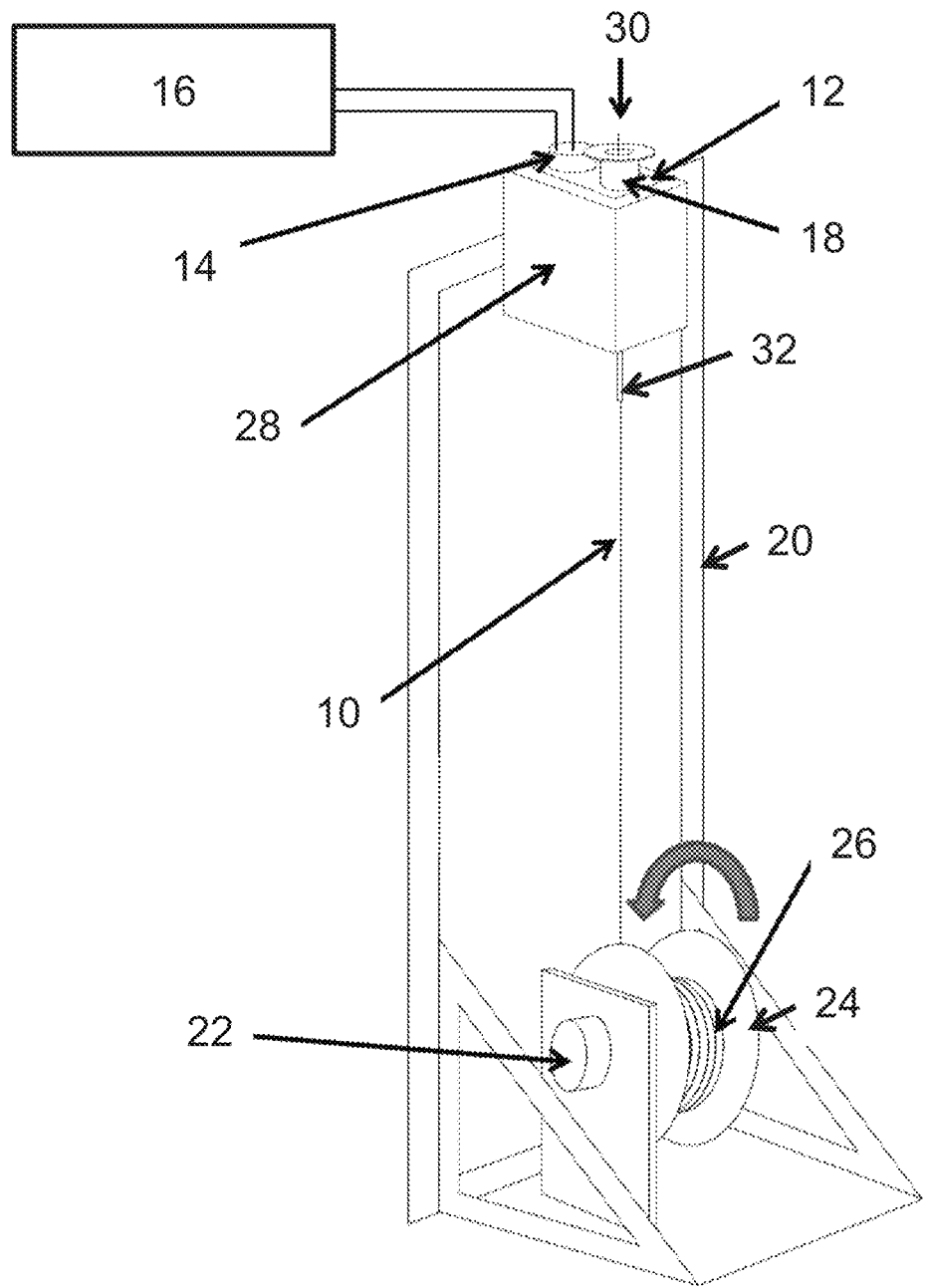
FIG. 1 is a schematic representation of an illustrative method of making a coaxial fiber for use in 3D printing.

Described below are embodiments of a 3D printing system and methods capable of non-planar 3D printing and 3D printing of FRP materials with out-of-plane fiber orientation and customizable fiber orientation in virtually any direction within a printed FRP article. Based on the teachings below, it is now possible to customize reinforcing fiber structure within a printed article by including fibers that follow the contour of the article, by including fibers that follow 3D splines within the article to provide extra resistance against applied load in particular directions, or to by forming a 3D fiber mesh that provides excellent structural support in bending, torsion, and shear. Continuous FRP fibers can be deposited along a non-planar path, such as along a contoured surface or along a path that is contoured in more than one plane. In some embodiments, the continuous reinforcing fiber can be co-deposited simultaneously with the polymeric component of the FRP, enabling real-time three-dimensional control over the orientation of the continuous fiber.

It is thus possible to fabricate continuous fiber FRP articles such as contoured shell structures via 3D printing, virtually eliminating the need for custom molds or patterns for each differently shaped FRP article to be fabricated. The ability to 3D print FRPs with no limit on controlled fiber orientation facilitates use of FRPs in multitudes of applications such as automotive and medical applications. For instance, there is a growing demand for materials such as FRPs that can reduce the weight of automobiles while simultaneously making their structures more effective in shock energy absorption, as well as an increasing need for materials within alternative-fuel vehicle power trains (e.g., battery cases, thermal management systems, etc.) that can withstand the unique and harsh conditions created by alternative fuels. In medical applications, custom-made assistive devices such as ankle-foot orthoses (AFOs), artificial limbs, and robotics, can be fabricated by 3D printing FRPs, potentially replacing conventional plaster casting methods, which are time-consuming, costly, and typically require multiple adjustments and modifications for proper fit. Other 3D printed FRP applications include customized biocompatible rigid fixation plates for stabilization of bone segments following fractures and/or surgical intervention, bone distractors used to correct the size and positioning of bones, implants to replace missing parts, and other customized devices that adequately fulfill the unique functional and anatomic demands for individual patients. 3D printing of FRPs can provide a desirable combination of customization, optimal shear, tensile, and compressive strengths, and some degree of formability in such application where metallic materials are challenging to manage and expensive to fabricate, and where unreinforced polymers lack the desired combination of mechanical properties for the range of complex tensile, bending, shear, and compressive demands placed on them in vivo. Also, tissue engineering of contoured load bearing tissues such as bone and cartilage could benefit from the use of the 3D printing methods described below to construct contoured scaffolds with optimal shape, fiber orientation, and mechanical properties. The methods are applicable to other areas of bioengineering as well.

Fused deposition modeling (FDM) is an AM process that includes depositing material in successive layers to produce a three-dimensional (3D) part. A conventional FDM system extrudes lines of molten material along a two-dimensional path (e.g., in an x-y plane) that rapidly solidify upon extrusion from a heated nozzle and forms successive layers in the third dimension (e.g., in successive x-y planes spaced apart along a z-axis). The materials typically employed in FDM are thermoplastic materials, such as poly(acrylonitrile-butadiene-styrene) (ABS) and polylactic acid (PLA). Thermoplastic materials become molten when sufficiently heated and cool rapidly in air after the heat source is removed. In molten form, these materials are viscoelastic fluids that are generally able to support their own weight and maintain their extruded cross-sectional shape upon release from the heated nozzle. This facilitates printed layers with a cross-section having an approximately 1:1 aspect ratio (height to width). By overlapping patterned 2D layers printed with 1:1 aspect ratios, the FDM process can fabricate relatively complicated 3D structures that are challenging to produce with traditional manufacturing techniques such as plastic molding or material removal processes.

One embodiment of the 3D printing system disclosed herein is configured to co-deposit a polymer and a reinforcing fiber along a desired printing path. The polymer and the reinforcing fiber exit the 3D print head simultaneously for deposition on a printing surface of a substrate or of a previously deposited layer of printed material. Several variations and combinations of features are possible. For instance, the polymer and reinforcing fiber may be in contact with each other during deposition, the reinforcing fiber may be embedded in the polymer during deposition, the reinforcing fiber may be encapsulated in the polymer during deposition, the reinforcing fiber may be a continuous fiber or part of a bundle and/or a core of reinforcing fibers, and/or the printing path may be contoured or otherwise non-planar, to list a few examples. In these examples, the polymer may be considered a printable matrix material, and the reinforcing fiber is configured to provide the co-deposited material with strength greater than that of the matrix material alone, particularly in the direction of orientation of the reinforcing fiber. The matrix material is not limited to polymeric materials and could include metallic, ceramic, biological, natural, or other materials. Indeed, not all embodiments of the 3D printing system include reinforcing fibers. The capability to 3D print non-planar layers of material can be adapted to all types of materials (polymer, metal, non-metal, etc.), with or without reinforcing fibers.

In a particular embodiment, the system uses a spool of composite material having a constant cross-sectional shape and dimensions along the entire length of the spooled material. The composite material may include a core coated with a polymer, and the polymer coating may be coaxial with the core. This configuration may be referred to as a co-axial fiber. The core includes one or more reinforcing fibers, each of which generally has a tensile strength greater than that of the polymer material of the coating. The fiber is not limited to any one material and can be carbon fibers, glass fibers, metallic fibers, natural fibers, ceramic fibers, medical suture fibers, or even polymer-based fibers such as Kevlar. The polymer coating is also not limited to any one material and may be thermoplastic, a thermosetting prepolymer, or a polymer that sets or cures when activated chemically and/or by exposure to light energy (e.g., laser light, UV, microwave, etc.), among others. Other embodiments of the 3D printing system are configured to co-deposit any two different materials, such as in the form of a coaxial fiber having a core formed from a first material and a coaxial coating formed from a second different material without limitations on the different types of materials.

The spool of material can be fed through and deposited from a nozzle of a system print head. In the case of a polymer-coated core, the polymer coating can be heated and/or melted during deposition, and the heated or molten polymer coating adheres the deposited material to previously printed material or other printing surface. Inclusion of the reinforcing fiber core enables the printer to deposit material along contoured or other non-planar surfaces and achieve overhanging features—i.e., the reinforced material can be deposited in some cases without underlying support from a substrate or previously printed material. This one-step co-deposition approach provides faster fabrication with less material waste than processes that require deposition of alternating layers of polymer and fibers. Co-axial fiber deposition also provides important structural advantages during fabrication compared to deposition of either fiber threads alone or polymer-only layers.

In the case of 3D printing of FRPs, the raw materials include the reinforcing fiber and the polymer material(s) of the co-axial fiber, which may be referred to together as an FRP strand. In the following description, the fibers are carbon fibers and the polymer is polycaprolactone (PCL); but as noted above, other types of fibers and/or polymers (e.g., polyamides, ABS, etc.) can be used. The choice of polymer is much broader with an FRP strand than with conventional unreinforced FDM materials. As discussed above, FDM-compatible polymers exhibit a viscoelastic molten form and rapid solidification to allow the unreinforced polymer to maintain a 1:1 aspect ratio during deposition. The FRP strand disclosed herein need not rely on the integrity of the polymer alone to maintain its cross-sectional shape or dimensions. Indeed, the reinforcing fiber may be considered primarily responsible for maintaining the cross-sectional shape and/or aspect ratio of the FRP strand during deposition, as the fiber material does not soften or melt during deposition. As such, candidate polymers are not required to exhibit a viscoelastic molten form or rapid solidification, and polymer compatibility with a printing system that uses FRP strands is therefore significantly more diverse than that with conventional FDM systems.

An example of fabrication of an FRP strand 10 for use in 3D printing is depicted in FIG. 1. The illustrated fabrication process uses an apparatus including a heat sink 12, a heating element 14, a temperature controller 16, a reservoir 18 of molten polymer (contained via a syringe barrel, for example), a frame structure 20, a motor 22, and a spool core 24 to collect the co-axial fiber 10 and form a spooled FRP strand 26. In this example, the heating element 14 and reservoir 18 are supported in an insulated housing 28 that is supported above or in otherwise spaced relation from the spool core 24 by the frame 20. In the exemplary coating process, an uncoated fiber core 30 comprises a bundle of one or more continuous fibers (e.g., carbon fiber threads) and is continuously pulled through the reservoir 18 of molten polymer (e.g., PCL) via the spool core 24, which rotates under the power of the motor 22. The coated fiber 10 exits the reservoir 18 through an orifice 32 (e.g., of an extrusion needle) and cools while being transported through a cooling fluid (e.g., air) to the spool core 24, where it is wound for use in the 3D printing system.

The diameter of the strand 10 depends on several variables such as the diameter of the core 30, the diameter of the orifice 32 (e.g., the inner diameter of the extrusion needle), and the speed at which the strand 10 is pulled and wound. For each needle diameter or orifice size, there is a range of optimum motor rotational speeds that ensures consistent polymer coating. Speeds that are too high can result in thin and uneven polymer coatings, while speeds that are too low can result in the formation of polymer beads along the strand. In an experimental example using the fabrication apparatus of FIG. 1, the diameter of the uncoated fiber core was about 0.4 mm, the extrusion needle inner diameter was 1 mm, and the filament motor speed pulled the fiber at a linear rate of about 0.9 mm/s. The resulting co-axial fiber 10 had a diameter of about 0.9 mm. To improve the printed device resolution, the co-axial fiber 10 diameter can be modified by reducing the diameter of the core 30 (e.g., by reducing the number of fiber threads within the core) and/or or decreasing the inner diameter of the orifice 32. With carbon fibers and PCL polymer, FRP stands ranging in diameter from 0.4 mm to 1.2 mm are feasible. Diameters outside this range are possible, and the strands are not limited to circular cross-sections or perfect coaxially alignment of the core and coating.

An exemplary 3D printing system (FIG. 5) includes a print head 40 and a plurality of independently moveable supports 42-48 that are operable to change the location and/or orientation of a printing substrate 50 with respect to the print head. In the illustrated example, the moveable supports include an x-axis stage 42 configured to move the substrate 50 along an x-axis of the system, a y-axis stage 44 configured to move the substrate along a y-axis of the system, a z-axis stage 46 configured to move the print head along a z-axis of the system, and a rotary stage 48 configured to rotate the substrate about a rotational axis, which is parallel with the z-axis of the system in this example. The illustrated print head 40 has a relatively long (in the z-direction), slender (in the x-direction) profile to enable 3D printing along highly articulated profiles—e.g., with deep concave features.

Figure 2:
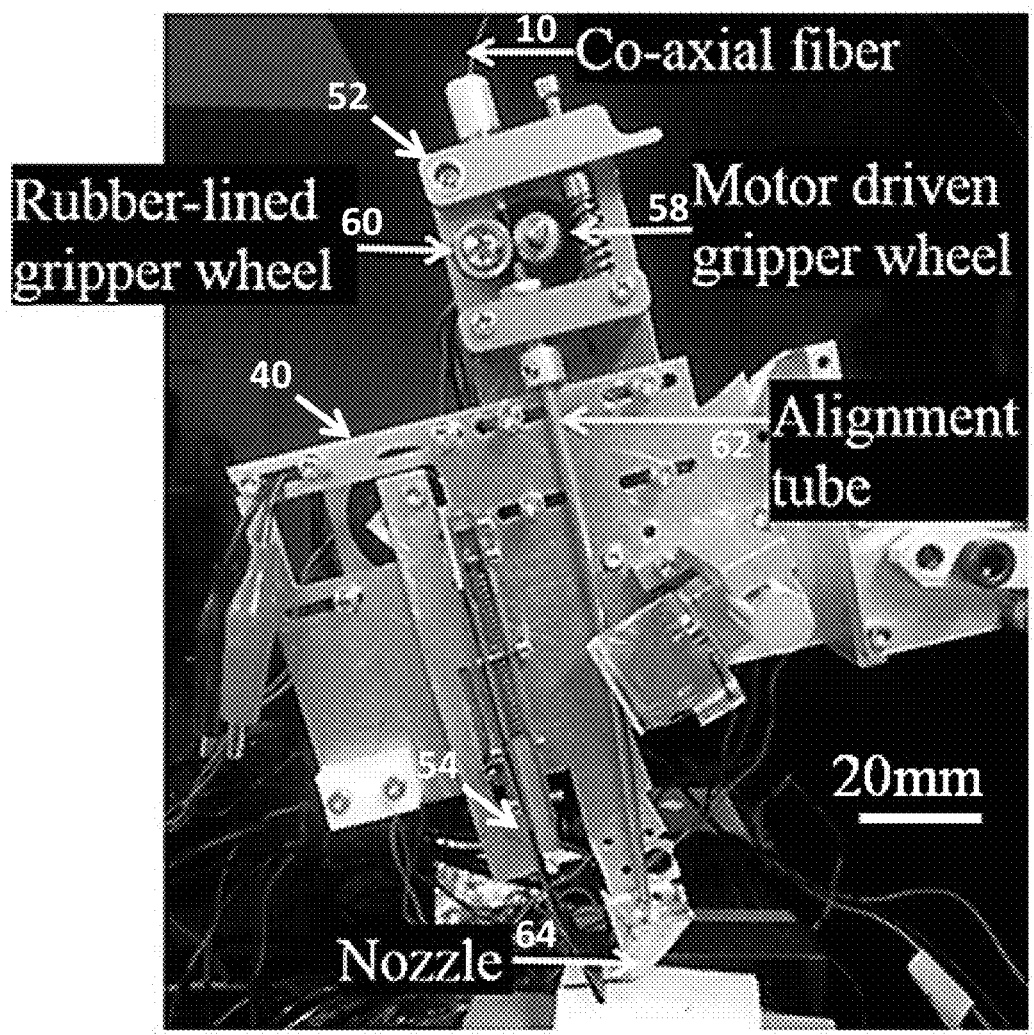
FIG. 2 is a photographic image of an example of a 3D print head capable of printing fiber-reinforced material.
Figure 3:
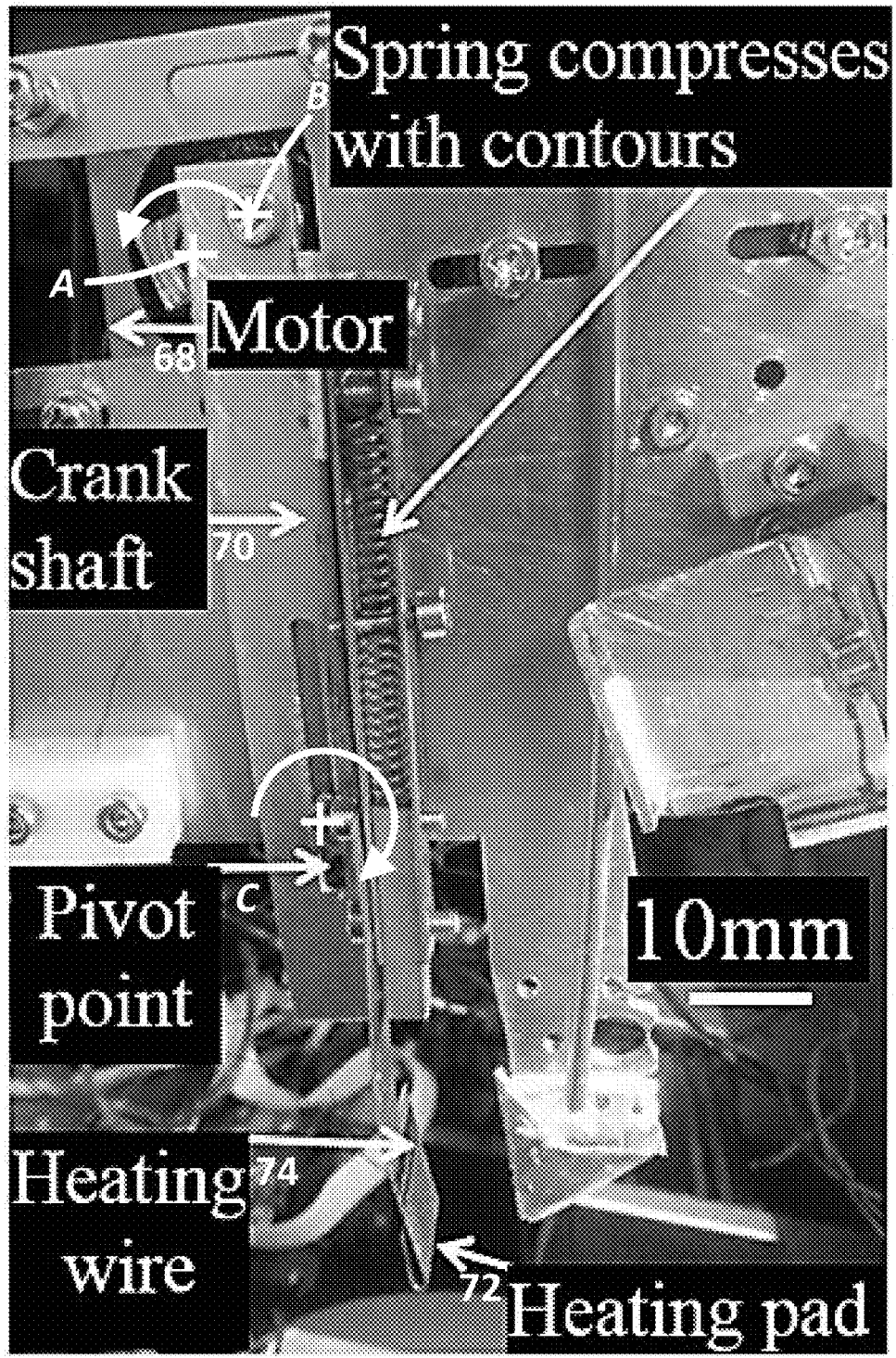
FIG. 3 is another photographic image of the 3D print head of FIG. 2.
Figure 4:
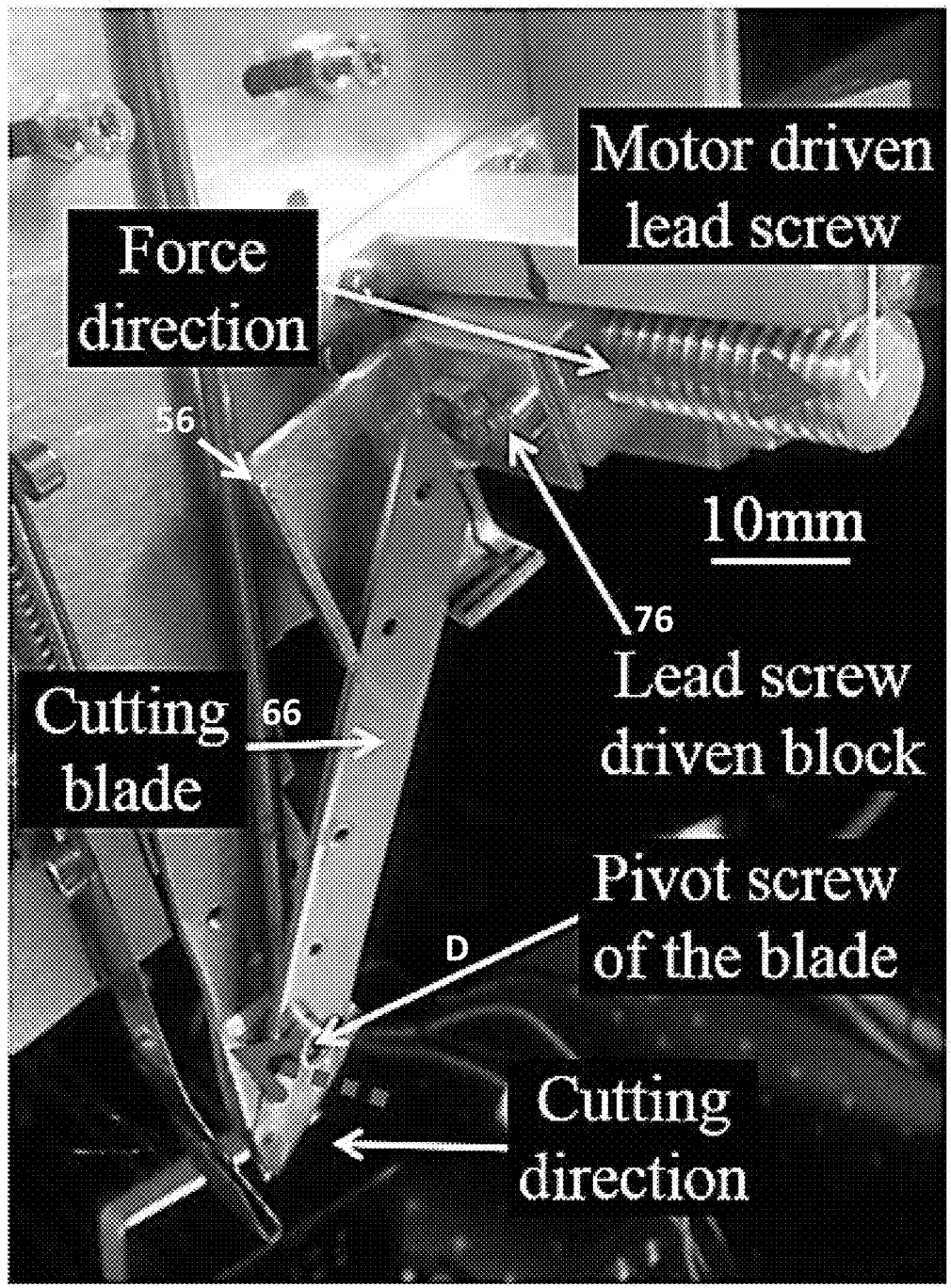
FIG. 4 is another photographic image of the 3D print head of FIG. 2.

With reference to FIGS. 2-4, the exemplary print head 40 may be described as comprising three sub-systems, including a feed system 52, a deposition system 54, and a cutting system 56. Each sub-system 52-56 may be driven with a stepper motor or other suitable actuator. The feed system 52 is configured to receive the FRP strand 10 from a material source (e.g., a spool of polymer coated fiber) and feed the strand through the print head 40 toward the printing surface. The deposition system 54 is configured to heat the polymer coating and place the heated coaxial fiber on the printing surface, which may include pressing or otherwise applying a force to the coaxial fiber at the proper position on the printing surface. The cutting system 56 is configured to release printed material from the print head 40 to allow the print head or substrate to move to a new location for more printing or to end the printing cycle.

The feed system 52 may include a driving motor or other actuator (not shown in FIG. 2) with a first driven gripping wheel 58 coupled to a shaft of the motor to rotate therewith, a second gripping wheel 60 (non-motor-driven in this example), a guide tube 62, and a nozzle 64 from which the co-axial fiber exits the print head for deposition on the printing surface. The guide tube 62 is an elongated tube of metal or other suitably rigid material in this example and guides the co-axial fiber 30 to the nozzle 64. Unlike conventional FDM print heads that incorporate a feed motor at the printing nozzle to feed the polymer directly from the nozzle, the illustrated system locates the feed system actuator remote from the nozzle to allow the deposition portion of the print head to be designed with a slender profile that facilitates printing of non-planar or contoured layers of material.

One suitable type of driving motor is a NEMA 17 stepper motor with a conventional FDM gripping wheel as the first gripping wheel 58. One or both of the gripping wheels 58, 60 may include a rubber or other high-friction outer lining that provides a flexible surface for effectively feeding the co-axial fiber 30 through the guide tube 62 and toward the nozzle 64. The two gripping wheels 58, 60 rotate as the motor turns, thereby feeding the polymer-coated fiber into the guide tube 62. The illustrated guide tube 62 is about 150 mm long with an inner diameter of 2 mm. The tube 62 guides the co-axial fiber to an end of the tube and directly below a blade 66 (FIG. 4) of the cutting system 56 that is elevated or otherwise moved away from the fed strand until actuated. The polymer coating of the co-axial fiber enables the fiber to traverse the elongated guide tube 62 without becoming tangled or buckling, which is a common problem when attempting to feed uncoated fibers through such a tube, particularly uncoated bundles of fine carbon fiber thread.

The co-axial fiber 10 enters the nozzle 64 after exiting the guide tube 62. In this example, in which the coaxial fiber 10 is fed through the print head 40 from the top of the print head toward a generally horizontal printing surface, the nozzle 64 is configured to bend the FRP strand—along a 5 mm radius in this example—from a first direction toward the printing surface to a different second direction generally parallel with the printing surface, thereby causing the FRP strand to be fed generally tangent with rather than perpendicular to the printing surface. This reduces clogging and misalignment issues that can occur due to the abrupt change in direction from perpendicular to tangential that would occur if the co-axial fiber is fed normal to the printing surface at the desired deposition location.

The illustrated deposition system 54 includes a motor (e.g., a NEMA 17 stepper motor) 68, a cranking arm 70, and a heating pad 72. As the motor 68 turns about a motor axis A, the cranking arm 70 pivots about an offset pivot axis B at one end of the cranking arm and transfers the rotational motion of the motor shaft to the heating pad 72 about another pivot axis C. In this example, the heating pad 72 is a heated pressing element configured to apply a force to the deposited material in the direction of the printing surface—i.e., the deposited material is squeezed between the pressing element and the printing surface. The illustrated heating pad 72 is resistance heated with loops of copper wire 74 with an applied voltage from a 5V DC supply and can move in both clockwise and counter-clockwise directions. The heating pad 72 acts a heat source that functions to heat the polymer coating of the co-axial fiber and thereby cause the coated fiber to adhere to the printing surface.

In operation, as the motor 68 rotates in a first direction about the motor axis A (e.g., CCW), the pivot axis B near the top end of the cranking arm 70 will rotate about the motor axis A in the same direction. In this example, the cranking arm 70 is slotted and guided along the pivot axis C such that the heating pad 72 will move in the opposite rotational direction from the motor (e.g., CW) about the pivot axis C. When there is a printing surface against which the heating pad 72 presses, the heating pad will still move in the clockwise direction, but the bottom half of its trajectory will follow that of the printing surface. The rotational movement from the crankshaft 70 combined with spring compression and flexibility designed into the heating pad 72 allows a portion of the print head to deform elastically as may be required by the substrate geometry. A rocking motion is introduced to the heating pad 72 via the crankshaft 70, enabling the heating pad to transfer the co-axial fiber to the printing surface while preventing the molten polymer of the coaxial fiber from adhering to the heating pad rather than the printing surface.

In this and other configurations, the heat source (i.e., the heating pad) for softening and/or melting the polymer of the coaxial fiber is located away from the nozzle and is instead part of the deposition system that presses the fed material against the printing surface to be adhered. In other words, the FRP printing material is not yet heated when it initially emerges from the nozzle of the print head. Instead it is heated as it is pressed into place at the desired location along the printing surface. This separation between the heating element and the nozzle ensures that the polymer coating of the co-axial fiber does not melt within the nozzle, which can cause the print head of the system to clog.

The illustrated cutting system 56 includes a motor (e.g., a NEMA 17 stepper motor; not shown), a gear-box (e.g., a 5:1 reduction gear box; not shown), a rotational-to-linear motion conversion mechanism 76 (e.g., a power screw), and the cutting blade 66 that pivots about a blade pivot axis D. The gear-box provides a torque multiplier to drive the cutting blade 66 with a strong force. The rotational-to-linear motion conversion mechanism 76 also provides a multiplier to the force generated by the motor. The illustrated cutting blade 66 is modeled after a nail cutter with a pivot screw localizing cutting force along the blade. The motor is configured to drive the cutting blade 66 onto the co-axial fiber, severing the fiber along the blade. Once the co-axial fiber has been severed, the driving motor from the feed system recoils the co-axial fiber to ensure separation between the two severed ends. Then, the cutting blade 66 is retracted into a raised position while the newly created end of the co-axial fiber is fed to the tip of the nozzle 64, thereby resetting the cutting system. The cutting system 56 in this example is configured for activation approximately 10 mm before the print head reaches the desired ending location for the particular strand being deposited. This distance represents the separation between the deposition location and the nozzle. The remaining co-axial fiber is passively deposited by following the deposited and anchored filament ahead of it on the printing surface.

Figure 5:
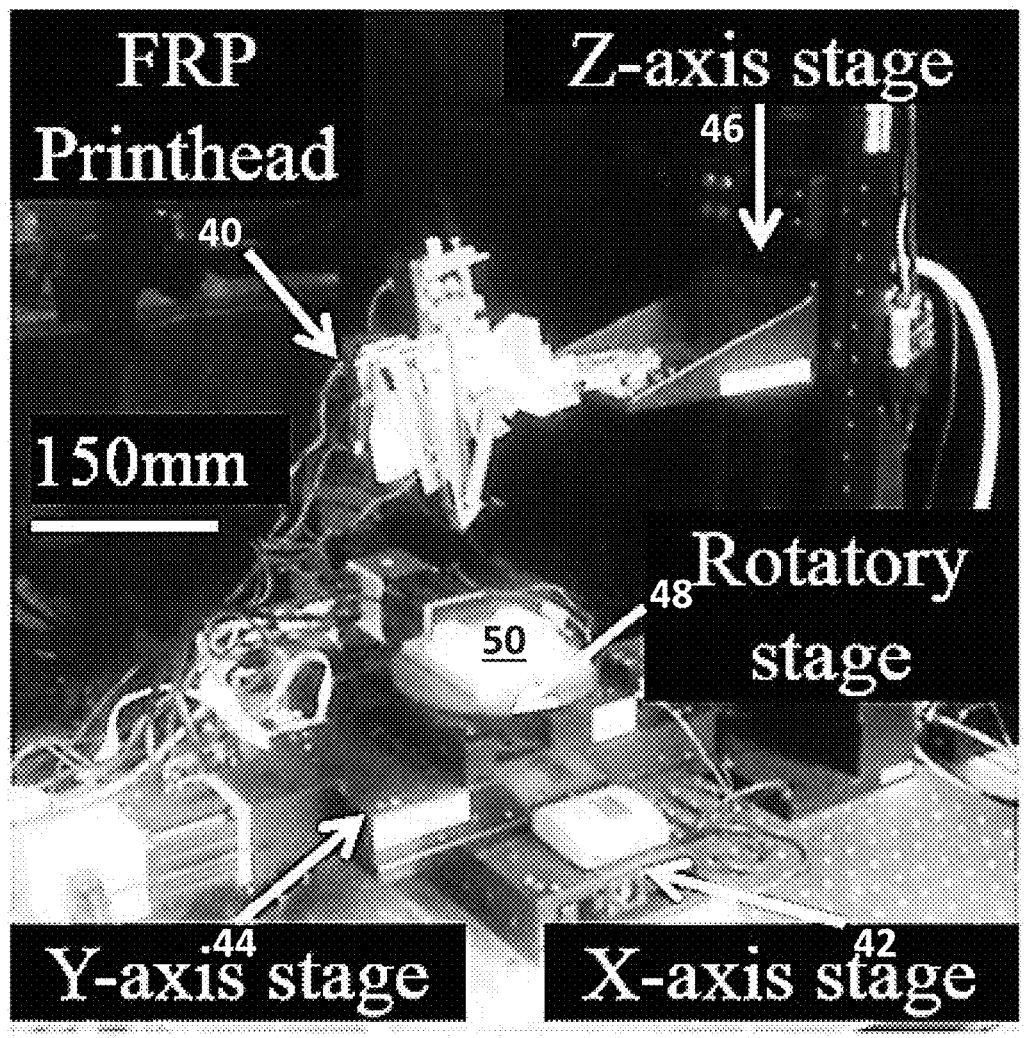
FIG. 5 is a photographic image of an example of a 3D printer including the 3D print head of FIG. 2.
Figure 6:
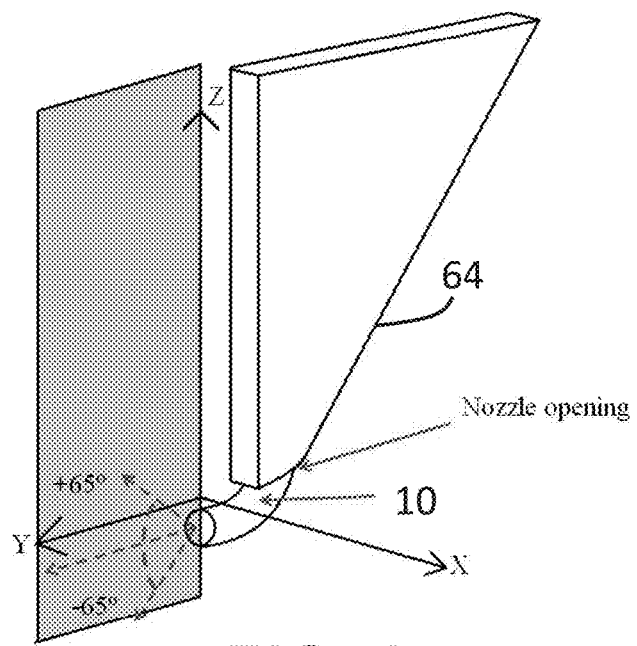
FIG. 6 is schematic illustration of deposition of the coaxial fiber from the print head.

FIG. 5 is a photographic image of the experimental FRP 3D printing system that includes the above-described print head 40. The particularly illustrated system has four degrees of freedom (4-DOF) via X, Y, Z, and rotary motor stages (each available from Aerotech, Inc., Pittsburgh, Pa., USA). The XY resolution is 1 μm, the Z resolution is 2 μm, and the rotary resolution is 1 degree. The print head 40 is mounted to the z-axis stage 46, while the substrate 50 is mounted to the rotary stage 48, which is mounted on the XY stages 42, 44. The combined motion of the 4 stages enables the print head to deposit complicated 3D patterns of co-axial fibers on the printing surface. The print head 40 is configured to accommodate tilted surfaces in the YZ plane up to ±65° from the horizontal XY plane (see FIG. 6). Although the illustrated configuration can only follow contours in the YZ plane, the system can be configured to follow arbitrary contours.

In some embodiments, the printing system includes an additional print head, such as in the form of a syringe or other reservoir of polymer material or a conventional FDM print head. This can allow the printing system to alternatively function as an FDM printer facilitating even further control over the fiber-to-polymer content of the printer article.

To demonstrate the complex deposition capabilities of the above-described FRP printer and highlight geometries that cannot be printed with conventional 3D printers, particularly with FRPs, three different parts were printed on poly(vinyl alcohol) (PVA) support substrates using the 3D printer illustrated in FIGS. 2-5. PVA was selected as the support substrate material due to its ability to be dissolved in water and thus separated easily from the printed FRP parts.

Figure 7:
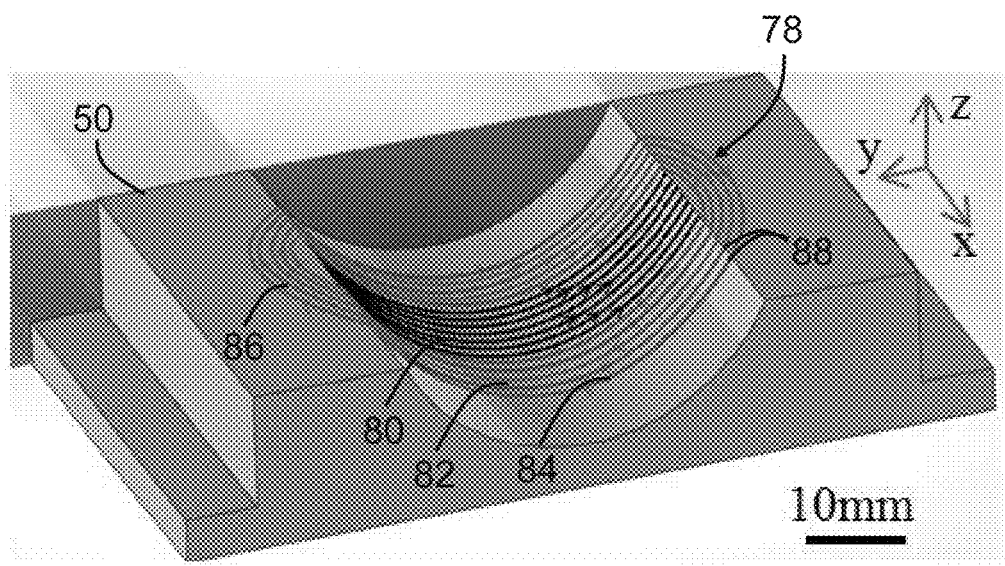
FIG. 7 illustrates a non-planar 3D printing path along a substrate.

FIG. 7 illustrates a support substrate 50 with a non-planar printing path 78 illustrated along the printing surface (i.e., the top surface) of the substrate. The illustrated printing path 78 includes an inner portion 80 and an outer portion 82 that circumscribes the inner portion. The outer portion 82 of the printing path includes a plurality of bi-planar lines—i.e., lines that have a first portion 84 contoured in the YZ plane and a second portion 86 contoured in the XY plane. The illustrated inner portion 80 of the printing path 78 includes a plurality of rastered lines contoured in only one plane (i.e., the YZ plane). In one example, the outer portion 82 is printed first, followed by the inner portion 80. While the substrate 50 could be oriented to enable a conventional 3D printer to follow either the second portion 86 of the outer portion 82 of the printing path 78 (e.g., with the substrate in the illustrated orientation) or the inner portion and the first portion 84 of the outer portion of the printing path (e.g., with the substrate rotated 90 degrees about the y-axis), the illustrated printing path with those combined features requires seamless transitions 88 between contours in the XY and YZ planes, particularly along the outer portion 80. This pattern 86 represents the first demonstration of contoured, 3D FRP printing.

Figure 8:
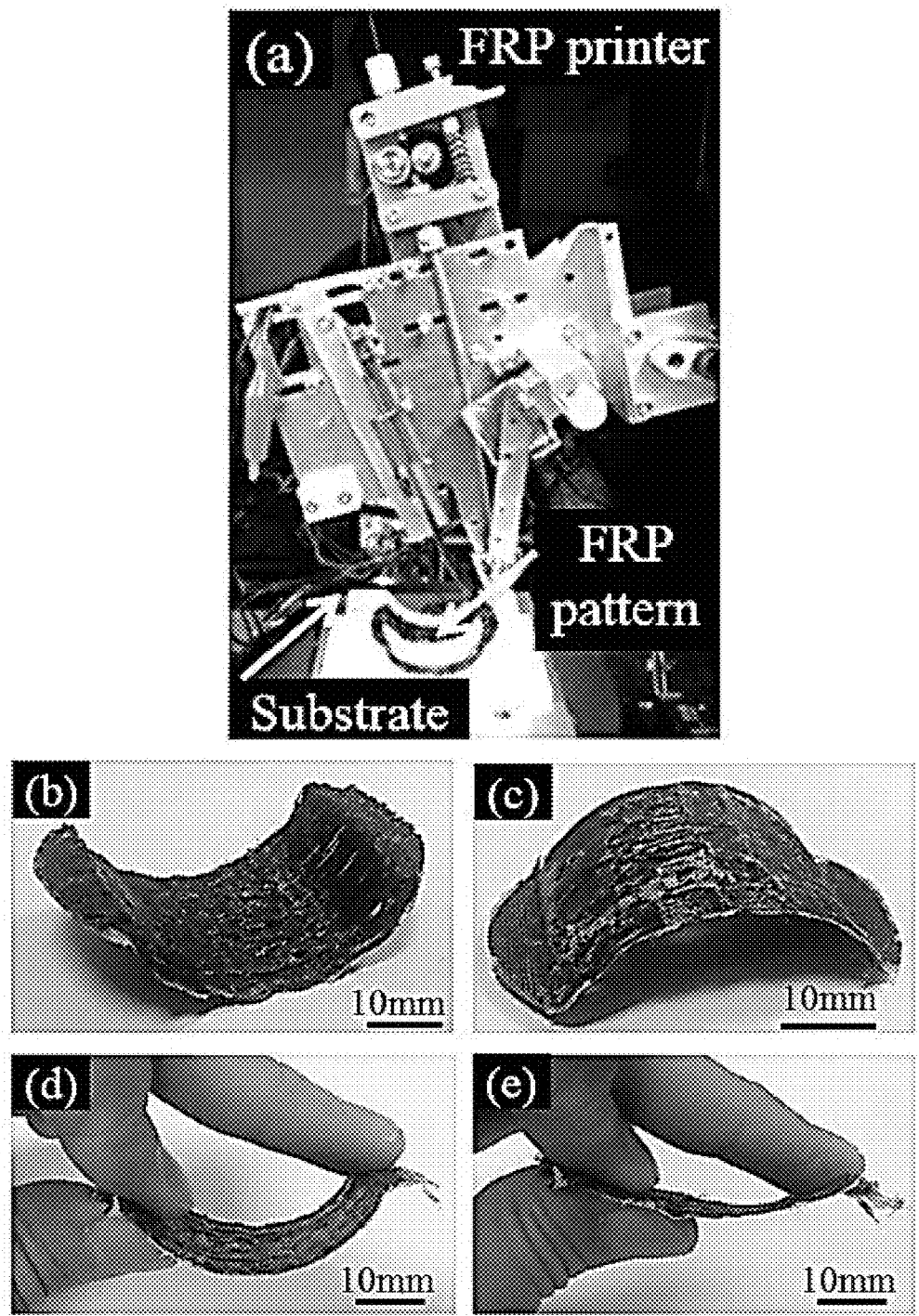
FIG. 8 includes a photographic image of the print head of FIG. 2 printing a fiber-reinforced polymer along the non-planar path illustrated in FIG. 7, along with photographic images of the 3D printed article.

FIG. 8(a) illustrates the FRP printing in progress, and FIGS. 8(b) and 8(c) illustrate the completed FRP article after removal of the PVA substrate. The illustrated single-layer co-axial fiber patterns (0.9 mm diameter lines, 1 mm layer thickness) were flexible and easily separated from the PVA substrate. FIGS. 8(d) and 8(e) illustrate the superior mechanical behavior of the printed FRP article compared to that of unreinforced polymer printed parts such as conventional FDM parts. For example, the U-shaped portion in the center of the printed FRP article could be flattened without breaking and returned to its original shape on removal of the flattening force. Typical 1 mm thick parts printed via conventional FDM processes are not able to tolerate the large amount of deformation illustrated in FIG. 8(e) without failure.

Figure 9:
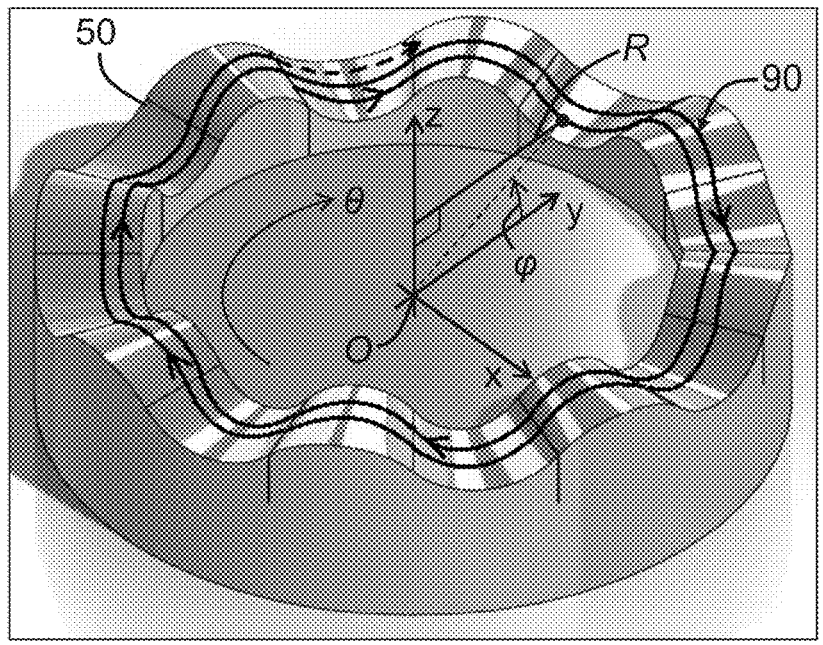
FIG. 9 illustrates another non-planar 3D printing path along a substrate.

FIG. 9 illustrates another support substrate 50 with a non-planar printing path 90 illustrated along the printing surface (i.e., the top surface) of the substrate. The illustrated printing path 90 has a generally spiral configuration with respect to the z-axis and has a wave shape along the circumferential direction or direction of the spiral. The printing path is composed of a multi-planar line—i.e., the deposited line of material is contoured in multiple planes. While a simple spiral or concentric circles about the z-axis would be contoured only in the XY plane in a planar printing path, the illustrated printing path 90 continuously and periodically changes position in the z-direction along the spiral and is thus contoured in an infinite number of planes, each of which is perpendicular to the XY plane. The printing path 90 of FIG. 9 can also be described with a coordinate system in which R is the perpendicular distance from the z-axis ($R^2=X^2+Y^2$), θ is the angular position about the z-axis, and φ is the angle with respect to a plane perpendicular to the z-axis that contains an origin O. In this example, R continuously increases as θ increases, and φ continuously varies, periodically increasing and decreasing as θ increases.

Figure 10:
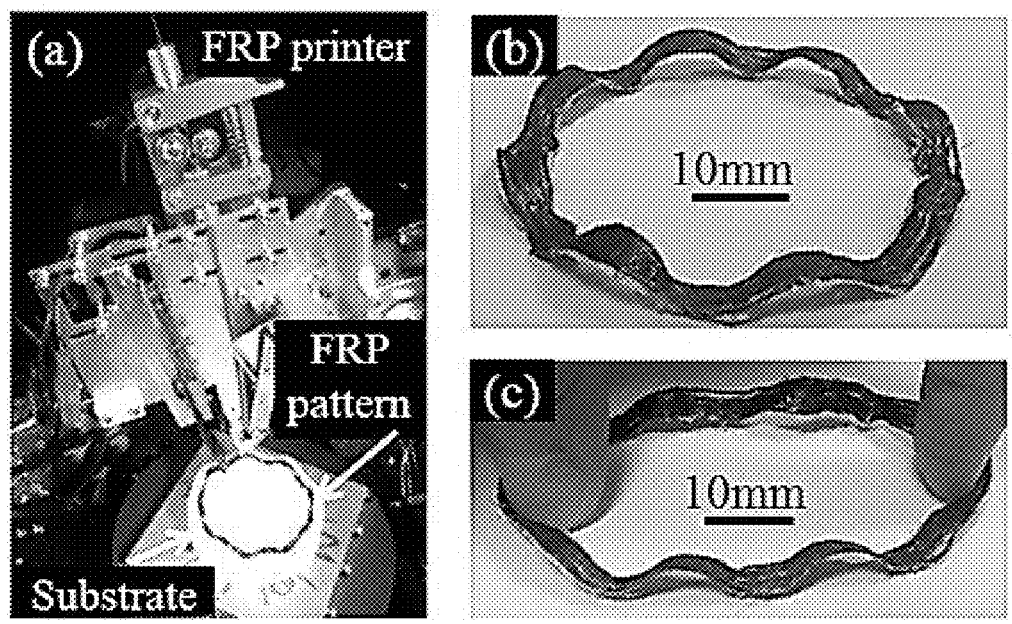
FIG. 10 includes a photographic image of the print head of FIG. 2 printing the fiber-reinforced polymer along the non-planar path illustrated in FIG. 9, along with photographic images of the 3D printed article.

Eight loops of co-axial fiber were printed on the support substrate illustrated in FIG. 9. FIG. 10(a) illustrates the FRP printing in progress, and FIG. 10(b) illustrates the completed FRP article after removal of the PVA substrate. The illustrated single-layer co-axial fiber patterns were found to be flexible and easily separated from the PVA substrate. FIGS. 10(*b*) and 10(*c*) illustrate the superior mechanical behavior of the FRP printed part compared to that of an unreinforced polymer printed part. The waved ring shaped can be flattened and/or radially deformed without breaking and returns to its original shape on removal of the deformation force. It is not known how a conventional FDM printed article behaves under similar deformation forces because it is not possible to fabricate the article illustrated in FIG. 10(*b*) via conventional FDM—with or without continuous or discontinuous reinforcing fibers.

Figure 11:
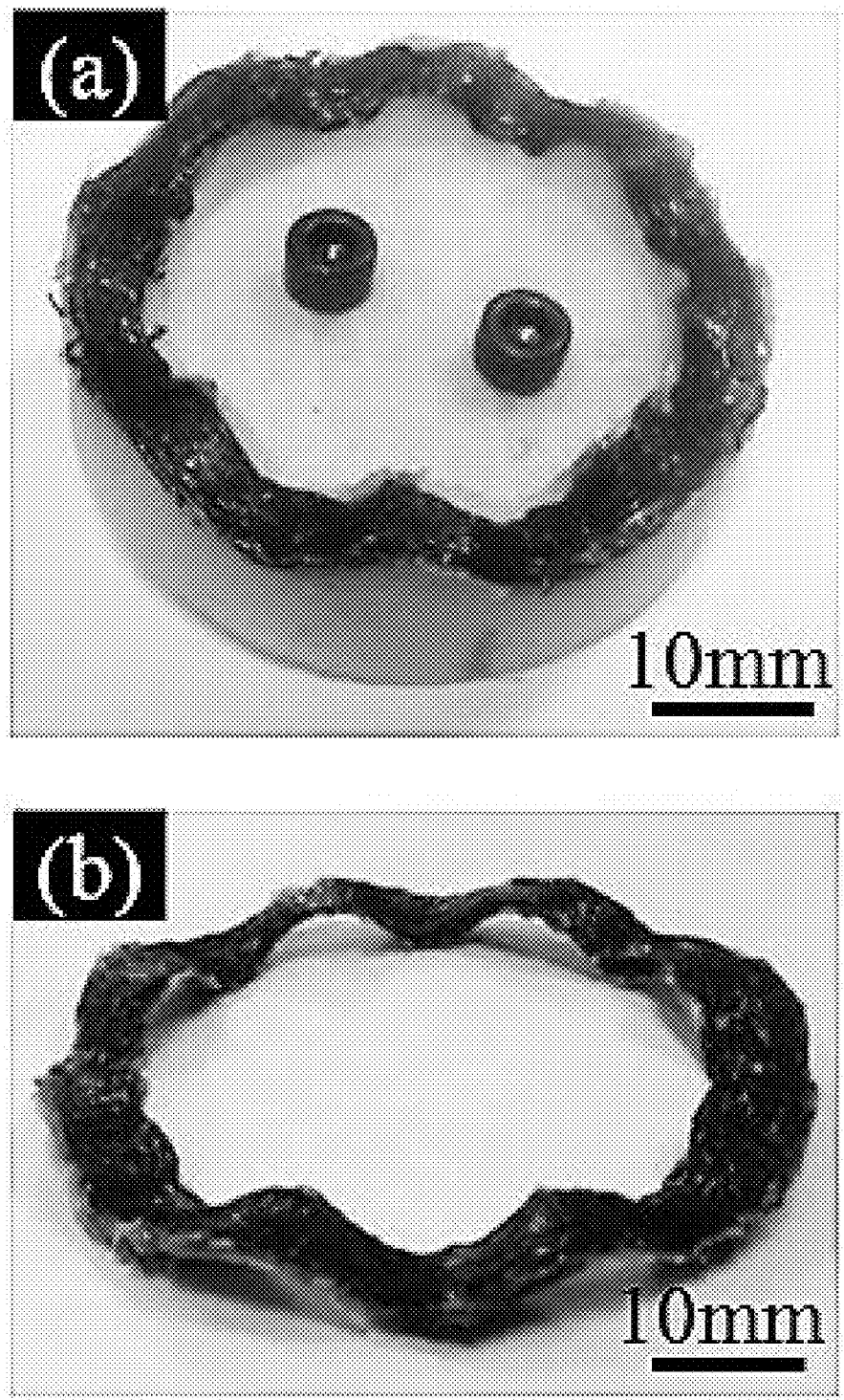
FIG. 11 includes photographic images of a multi-layer 3D printed article printed along the non-planar path illustrated in FIG. 9.

Using the substrate illustrated in FIG. 9, multi-layered, multi-planar FRP printing was also performed. Five consecutive layers of continuous fiber reinforced polymer were deposited, with the first layer deposited on the substrate surface and each subsequent layer deposited on the previous layer (i.e., stacked in the z-direction). Each of the five layers included 8 curved loops (~60 mm inner diameter) spiraled about the z-axis. To ensure adhesion between adjacent layers, the co-axial fibers were pressed against the previously deposited layer. This resulted in finished layers that were slightly smaller than the single layered pattern—the five layers totaled about 2.7 mm in thickness. The printed article on the supporting substrate is shown in FIG. 11(*a*). The deposition of multiple layers resulted in a much stronger adhesive force between the substrate and the printed article, and the substrate had to be dissolved to retrieve the printed FRP article of FIG. 11(*b*). Additionally, the multi-layer article of FIG. 11(*b*) was more significantly more rigid than the single-layer article of FIGS. 10(*b*) and 10(*c*). While each of the multiple layers in this example are deposited printed following the same pattern as, the system can be configured to deposit the fiber(s) in any desired orientations in each layer when building a 3D structure.

The examples of FIGS. 8-11 represent the first known demonstration of contoured, multi-layered additively manufactured FRP articles. While similar contoured articles with multiple reinforced layers may be fabricated using conventional methods such as hand lay-up or stacking layers of FRP sheets in a mold, the above-described additive manufacturing technique represents the ability to achieve real-time design and mechanical/physical property customization and presents a unique capability that will expand the application of FRP in commercial technologies.

In other embodiments, the reinforcing fibers may be oriented out-of-plane with deposited polymer but are not necessarily presented as part of a coaxial fiber with a polymer coating, the reinforcing fibers are not necessarily co-deposited with the polymer, and/or the reinforcing fibers do not necessarily follow the contour of the deposited polymer.

Figure 12:
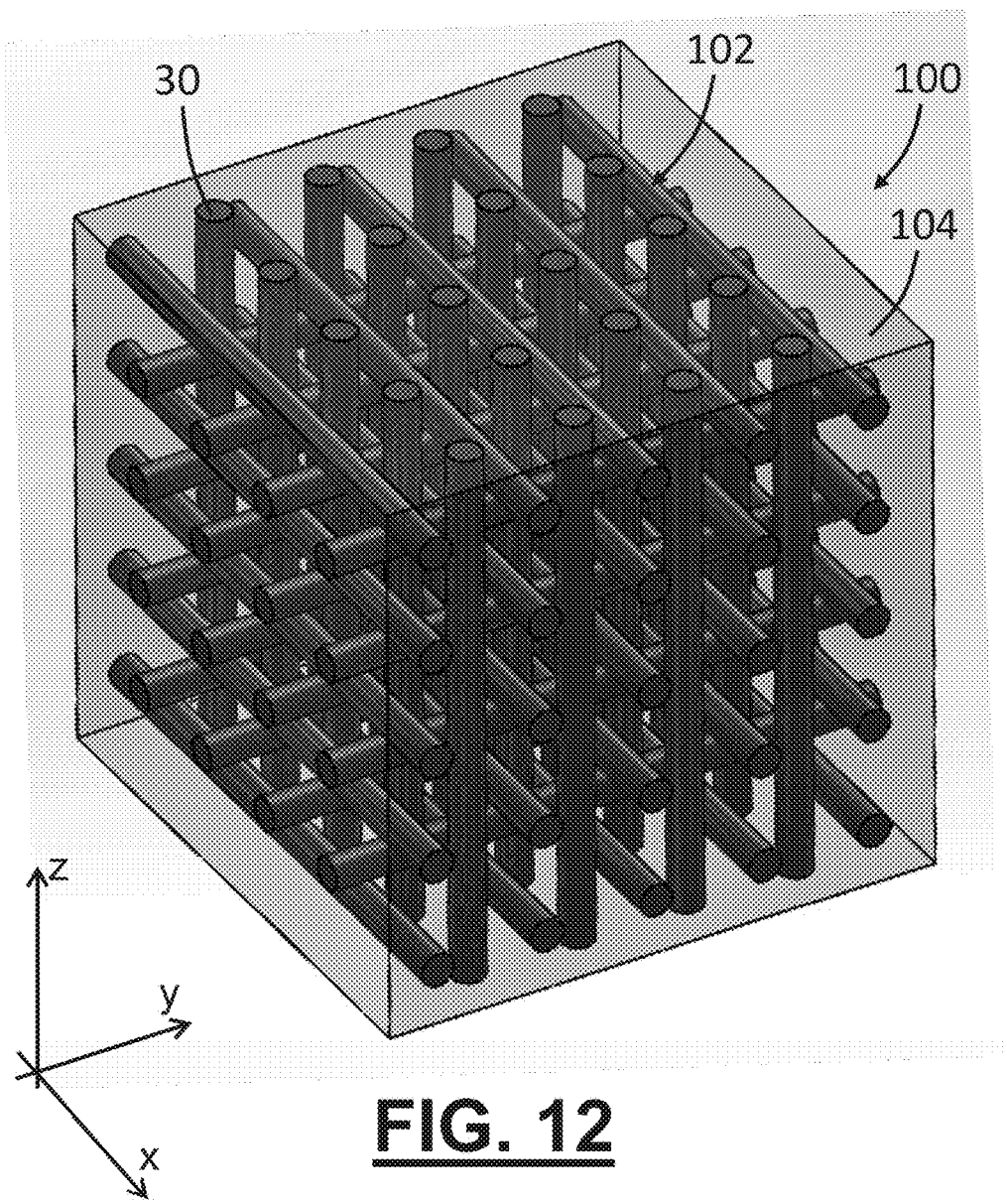
FIG. 12 is a volumetric section of an FRP article comprising a 3D mesh of reinforcing fibers.

FIG. 12 is a volumetric section (e.g., a cubical piece) of a 3D printed article 100 according to one embodiment. This example includes a plurality of fiber bundles 30, each bundle comprising one or more individual reinforcing fibers. The fiber bundles 30 are arranged in a 3D fiber mesh 102 and embedded in a polymer or polymer-based material 104. The illustrated fiber mesh 102 includes three arrays of fiber bundles 30 with each array containing fiber bundles oriented with the lengthwise dimension in the x-direction, the y-direction, or the z-direction. In this particular example, the mesh 102 includes alternating layers of fiber bundles 30 with adjacent layers having the fibers oriented perpendicular to one another. The structure of FIG. 12 can be described as having a first or bottom layer of fiber bundles in an XY plane with the bundles spaced along the y-direction and the fibers oriented in the x-direction; an adjacent second layer of fiber bundles parallel with the first layer in a parallel XY plane with the bundles spaced along the x-direction and the fibers oriented in the y-direction; and one or more additional layers with alternating bundle spacing and fiber orientation directions. The result is a grid pattern of fiber bundles when viewed in the z-direction. Further, the structure of FIG. 12 includes a fiber bundle oriented in the z-direction and located in each one of the openings of the grid pattern of x- and y-oriented bundles to form the 3D mesh. This mesh structure is non-limiting. For instance, off-axis fiber orientation is possible, more than three fiber directions are possible in a given mesh, the fibers may be oriented along non-rectilinear paths, and not all grid openings may contain fiber bundles. While conventional FRP processes sometimes use woven, braided, or other fiber structures to be laid-up in a mold or on a forming tool, 3D printing an article with a 3D mesh is not conventional.

Figure 13:
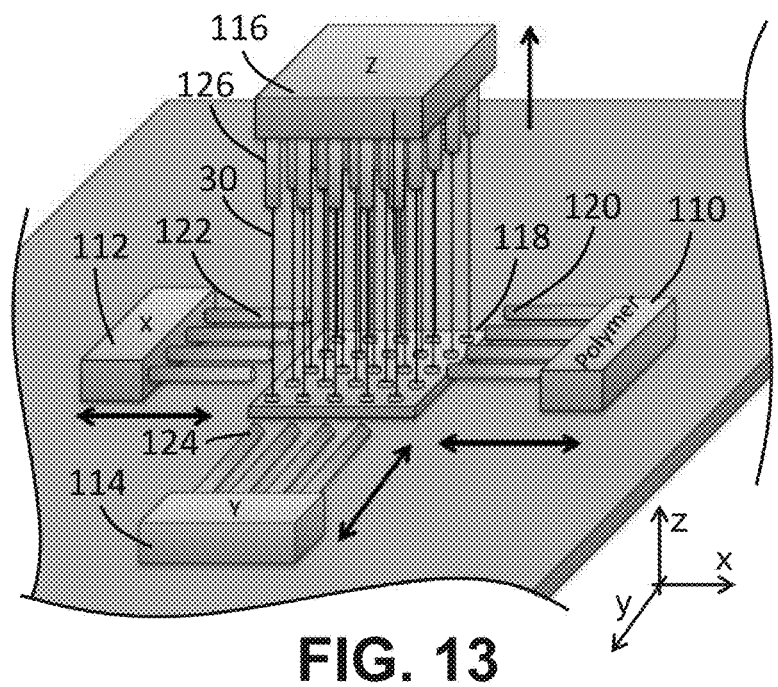
FIG. 13 is an example of a 3D printing system configured to embed fibers in a printable matrix material in a direction that is perpendicular to the plane of printed polymer layers.

FIG. 13 schematically illustrates an example of a 3D printing system capable of fabricating an FRP article having a 3D fiber mesh and/or reinforcing fibers oriented out-of-plane with respect to layers of polymer deposited in x-y planes, such as fibers oriented in the z-direction. In the illustrated example, the printing system is configured to fabricate an FRP article with continuous reinforcing fibers 30 oriented in the z-direction throughout the printed article. The illustrated system generally relies on planar deposition of XY layers of polymer stacked on one another and includes a polymer print head 110, a first fiber print head 112 configured to deposit fibers oriented in the x-direction, a second fiber print head 114 configured to deposit fibers oriented in the y-direction, a third fiber print head 116 configured to provide fibers oriented in the z-direction, and a base 118.

In operation, an array of fibers or fiber bundles extends from the third fiber print head 116 at one end and is fixed to the base 118 at an opposite end. The third fiber print head 116 is configured to move in a direction (upward in this case) away from the printed material as the article is fabricated while continuing to provide z-direction fibers to the process. A first layer of polymer is deposited by the polymer print head 110 in an x-y plane over the base 118. The illustrated print head 110 includes a plurality of nozzles 120 configured to discharge molten polymer and arranged to fit between the fibers extending from the third print head 116 to the base 118. The polymer print head 110 can move in the x-direction from the illustrated position to a position with the ends of the nozzles 120 at the opposite side of the base 118. The print head 110 can then discharge molten polymer as it moves in the x-direction back toward the illustrated position. The print head 110 may simultaneously move back and forth in small y-direction movements between the z-oriented fibers to better distribute the molten polymer. In another example, the polymer print head 110 is static or has no such back and forth motion and the polymer is discharged under high pressure to better distribute the polymer of each layer around the z-oriented fibers. This first polymer layer is cured into the desired shaped.

A layer of x-oriented fibers is then deposited over the polymer layer by the X print head 112 in an x-y plane. The illustrated X print head 112 includes a plurality of nozzles 122 configured to discharge bundles of one or more reinforcing fibers and arranged to fit between the z-oriented fibers extending from the third print head 116. The X print head 112 can move in the x-direction from the illustrated position to a position with the ends of the nozzles 122 at the opposite side of the base 118. The print head 112 can then discharge fibers as it moves in the x-direction back toward the illustrated position.

A layer of y-oriented fibers is then deposited over the x-oriented fibers by the Y print head 114 in an x-y plane. The illustrated Y print head 114 includes a plurality of nozzles 124 configured to discharge bundles of one or more reinforcing fibers and arranged to fit between the z-oriented fibers extending from the third print head 116. The Y print head 114 can move in the y-direction from the illustrated position to a position with the ends of the nozzles 124 at the opposite side of the base 118. The print head 114 can then discharge fibers as it moves in the y-direction back toward the illustrated position. The order of deposition of the x-oriented and y-oriented fibers is arbitrary.

Another layer of polymer is then deposited over the fibers by the polymer print head 110 and cured into the desired shape. Alternatively or additionally, a layer of polymer can be deposited between deposition of the x- and y-oriented fibers. These steps are repeated until the desired article is complete. Any residual overhanging fibers not cured into polymer of the desired shape may then be trimmed away. Mechanical properties of the printed article can be tailored via selection of the type of fiber, fiber size, inter-fiber spacing, polymer type, etc. In some embodiments, the fiber bundles 30 may be replaced with the above described co-axial fibers (i.e., polymer-coated fiber bundles).

Figure 14:
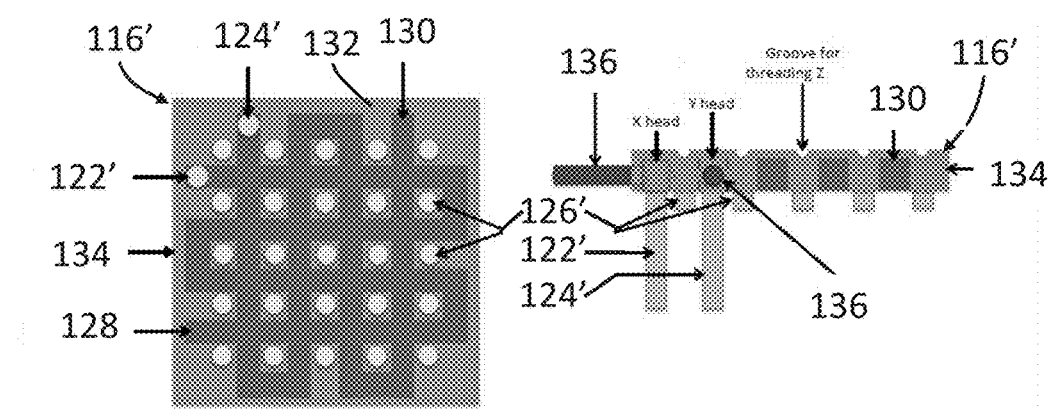
FIG. 14 is an example of a 3D print head configured to print fibers in three mutually perpendicular directions.

In another example, the three fiber print heads of FIG. 13 are integrated into a single print head 116' as shown in FIG. 14. The left side of FIG. 14 is a bottom (facing the printing surface) view of the print head 116', and the right side of FIG. 14 is a side view of the print head, which is generally configured and oriented like the Z print head 116 of FIG. 13 with certain modifications and additional features, including a first fiber nozzle (X nozzle) 122' and a second fiber nozzle 124' (Y nozzle). Each nozzle 122', 124' is configured to fit in and move along a respective X channel 128 and Y channel 130. The illustrated channels are formed in a face 132 of and partly through a print head plate 134 of the print head 116'. In this example, a plurality of rods 136 is included, each rod arranged to slide within an opening formed within the thickness of the plate 134. These rods 136 can be used to move each nozzle 122', 124' along its respective channel 128, 130 and thereby weave fibers back and forth among the z-oriented fibers and the plurality of Z nozzles 126'. The integrated print head 116' may operate in conjunction with a base 188 and a polymer print head 110 similar to that of FIG. 13 with fiber being woven back and forth in the x-direction and/or the y-direction among the z-oriented fibers between deposited layers of polymer. The print head 116' may be configured to be interchangeable to provide the desired density and thickness of fibers and dimensions of printed material.

In some embodiments, features of the illustrative 3D printing system described in conjunction with FIGS. 1-11 can be combined with features of the print heads of FIGS. 13 and 14. For instance, the print heads of FIGS. 13 and 14 can be part of a 3D printing system with moveable X, Y, and Z stages, rotary stages, and/or with the ability to tilt the print head and/or substrate support to orient the fibers in different planes.

Some embodiments of a 3D mesh can be printed using a printing system configured to print the above-described co-axial fibers (e.g., polymer-coated fibers). In such embodiments, an XY or contoured lattice structure with custom designed spacing between adjacent lines of the printing path can first be printed. In one embodiment, electrically conductive z-oriented fibers are inserted into the openings of the lattice in the z-direction, and the fiber is electrically charged to generate enough heat to melt the polymer coating it, effectively anchoring the materials in place. In another embodiment, the z-oriented fibers are non-conductive, and a long nozzle is used to feed molten polymer into the Z axis channel to adhere the fibers in place. Any residual spaces between the XY and Z fibers can also be filled with the polymer using this method.

Figure 15:
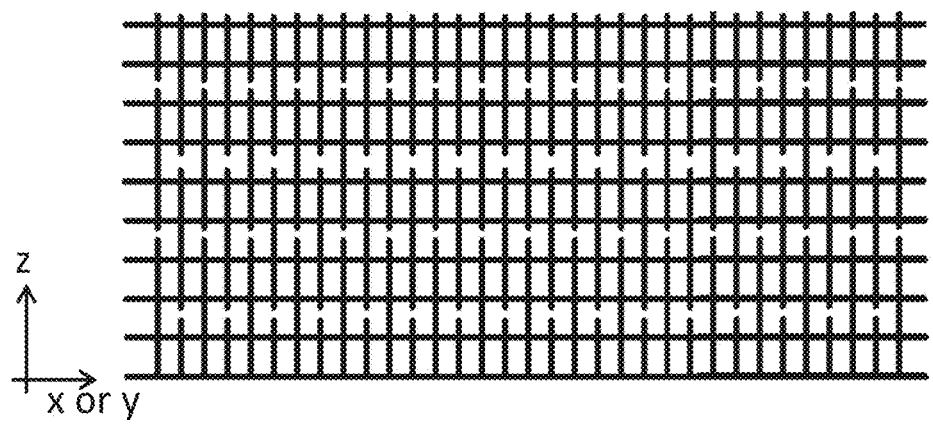
FIG. 15 is a schematic side view of a 3D mesh of reinforcing fibers including discontinuous fibers in the z-direction.

FIG. 15 is a schematic side view of an exemplary fiber mesh 102' with discontinuous fibers in the z-direction. In this example, each z-oriented fiber spans only four layers of FRP. Each layer of FRP is represented by a horizontal line in FIG. 15. The first or lower ends of each successive z-oriented fiber are located two polymer layers apart from each other. As shown, alternating z-oriented fibers extend from the first to fourth FRP layer and from the third to sixth FRP layer, for example. Alternating the locations of the ends of the z-oriented fibers in this manner prevents a weakness plane that may otherwise be formed if all z-oriented fibers begin and/or end in the same FRP layer. This arrangement ensures at least half of the area in each layer gets reinforced in z-direction. In other embodiments, ends of the out-of-plane fibers can be distributed among more than just two layers—for instance, fibers spanning 4 FRP layers could have ends distributed evenly among the 4 layers, and longer fibers could have ends distributed among even a higher number of layers. The distance between fibers and/or fiber ends can be varied, and the strength of the structure against shear force, torsional loads, or other specific directional loads can thereby be optimized.

FIGS. 16-20 illustrate various views and components of another embodiment of a print head for the 3D FRP printing system. This embodiment has many elements in common with that described above in conjunction with FIGS. 2-10, and similar elements are similarly labeled. For instance, the illustrated print head includes a feed system, a deposition system, and a cutting system. The particularly illustrated print head is configured for deposition of co-axial fibers as described above and is thus capable of producing an FRP article with reinforcing fibers that follow the contour of the article. The continuous fiber and polymer are simultaneously co-deposited. A working example of the illustrated print head has been built and was configured only for in-plane printing (i.e., stacked parallel and planar layers of FRP strands). Of course, this design can and has been modified to facilitate deposition of non-planar layers.

Figure 16:
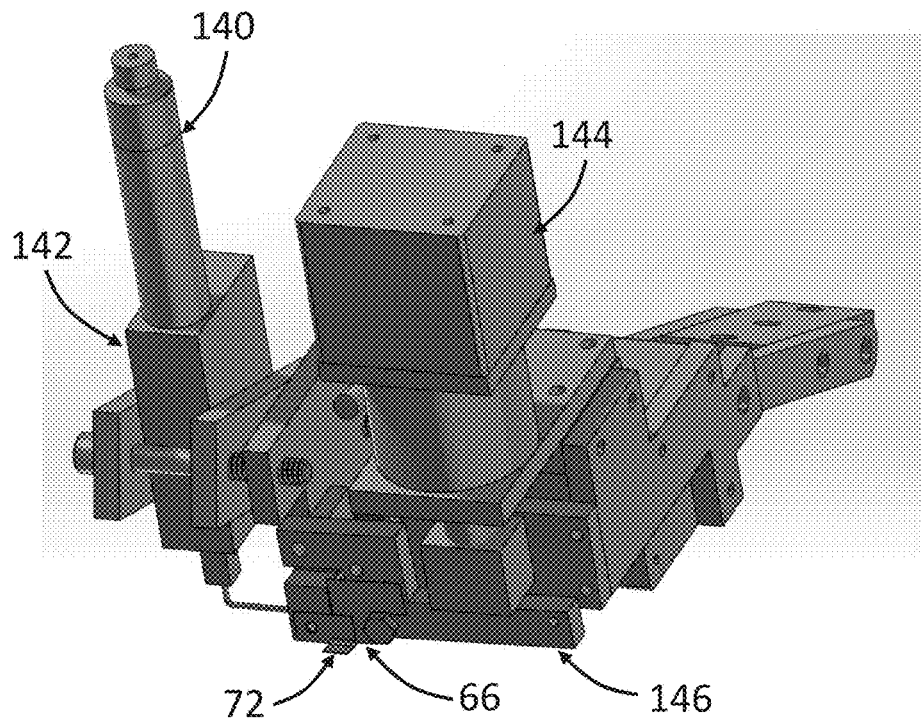
FIGS. 16-20 are various views of an example of a 3D print head configured to print co-axial fibers.
Figure 17:
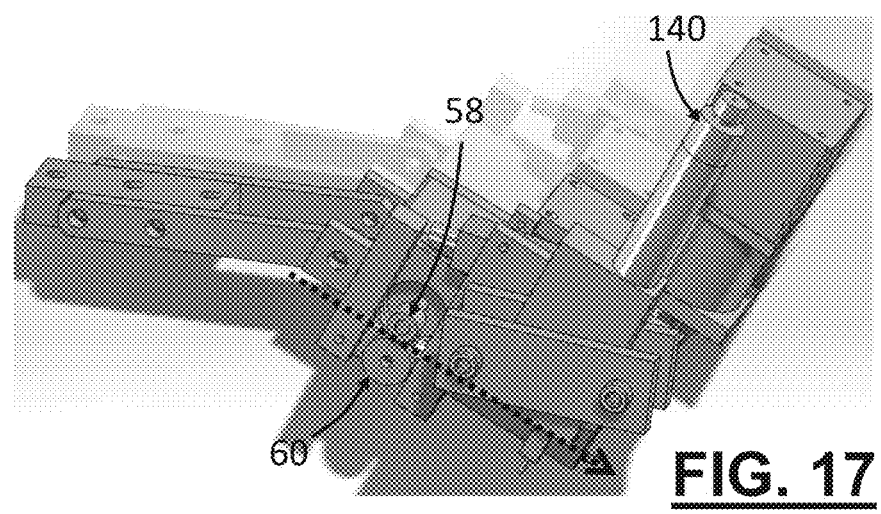
Figure 18:
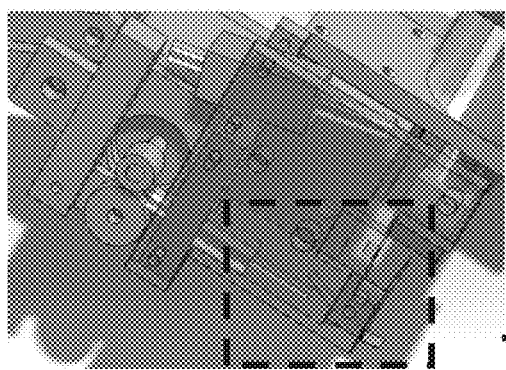
Figure 19:
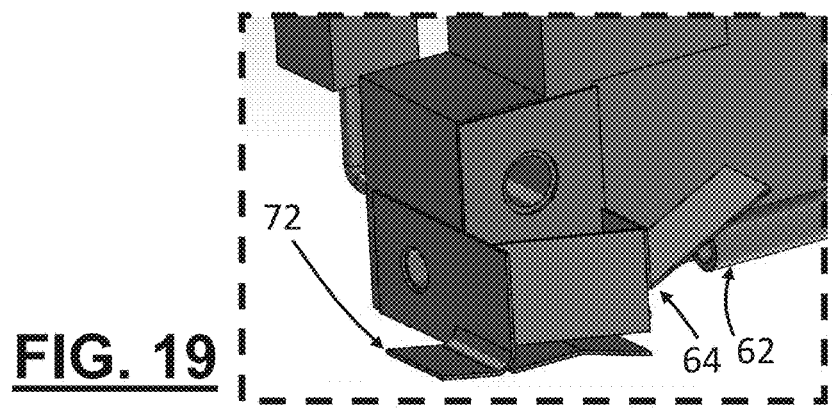
Figure 20:
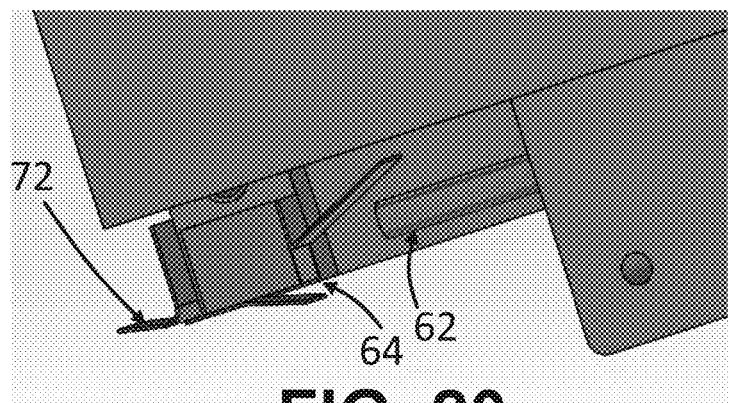

FIG. 16 is a front perspective view of the print head with several components labeled, including the cutting blade 66, which is part of the cutting system that releases the FRP strand from the print head at the end of a printing path. FIG. 17 is a left side view of the print head of FIG. 16 and illustrates the pathway of the FRP strand through the print head via a dotted arrow, includes first and second wheels 58, 60 of the feed system. FIG. 18 is a view of a portion of FIG. 17 with some of the outermost components made partially transparent to illustrate components of the feed system and deposition system, and FIG. 19 is a front/side view from the opposite side of the portion of the print head within the dashed line of FIG. 18. FIG. 20 is a rear/side view of the portion of the print head shown in FIG. 19.

The illustrated print head includes an additional polymer feeder 140 in the form of a metal syringe, which combines a polymer reservoir, a plunger or pressurizer to force material out of the reservoir, a heater to melt the polymer, and a heat sink 142 to keep the heat localized. Other illustrated components of the cutting system include the driving motor 144 that actuates the other components of the cutting system and the lever arm 146 that moves the cutting blade 66 upon actuation. The deposition system includes a heating pad 72 similar to the earlier described print head heating pad. Other similar components include the feed tube 62 of the feed system, and a funnel or nozzle 64 configured to receive the FRP strand from the feed tube and direct the strand toward the printing surface and beneath the heating pad 72.

A method of fabricating an FRP article including a 3D XYZ mesh is now described. One embodiment includes post-process insertion of the z-oriented fibers. In this example, co-axial fibers are printed and layered in the x- and y-directions to form an XY lattice structure with a plurality of vertically z-oriented channels at the lattice openings. After the desired number of layers is deposited so that the lattice is at the desired height in the z-direction, co-axial fibers are then fed into these vertical channels from the top. The polymer coating component of the co-axial fibers will harden or cure after reaching the bottom of the channels, binding the z-oriented fibers in place to arrive at the 3D printed FRP article with an XYZ fiber mesh.

Another embodiment includes an element of glass printing and may be considered to include in situ insertion of the z-oriented fibers. This embodiment may include the following steps:
1. Co-axial fibers are deposited in a first layer in the x- and y-directions in an XY plane to form a rastered lattice structure;
2. Molten glass droplets are printed directly into the channels of the co-axial fiber lattice;
3. The co-axial fibers and glass droplets are cured until solidified;
4. Steps 1-2 are repeated to form a second layer;
5. A laser beam is focused at the interface of the glass droplets in the first layer and the second layer, melting the glass and the interface and welding the glass droplets in the two layers together; and
6. Steps 1-5 are repeated until the desired design geometry is obtained, resulting is a 3D printed fiber and glass reinforced polymer with a 3D XYZ reinforcing network.

Figure 21:
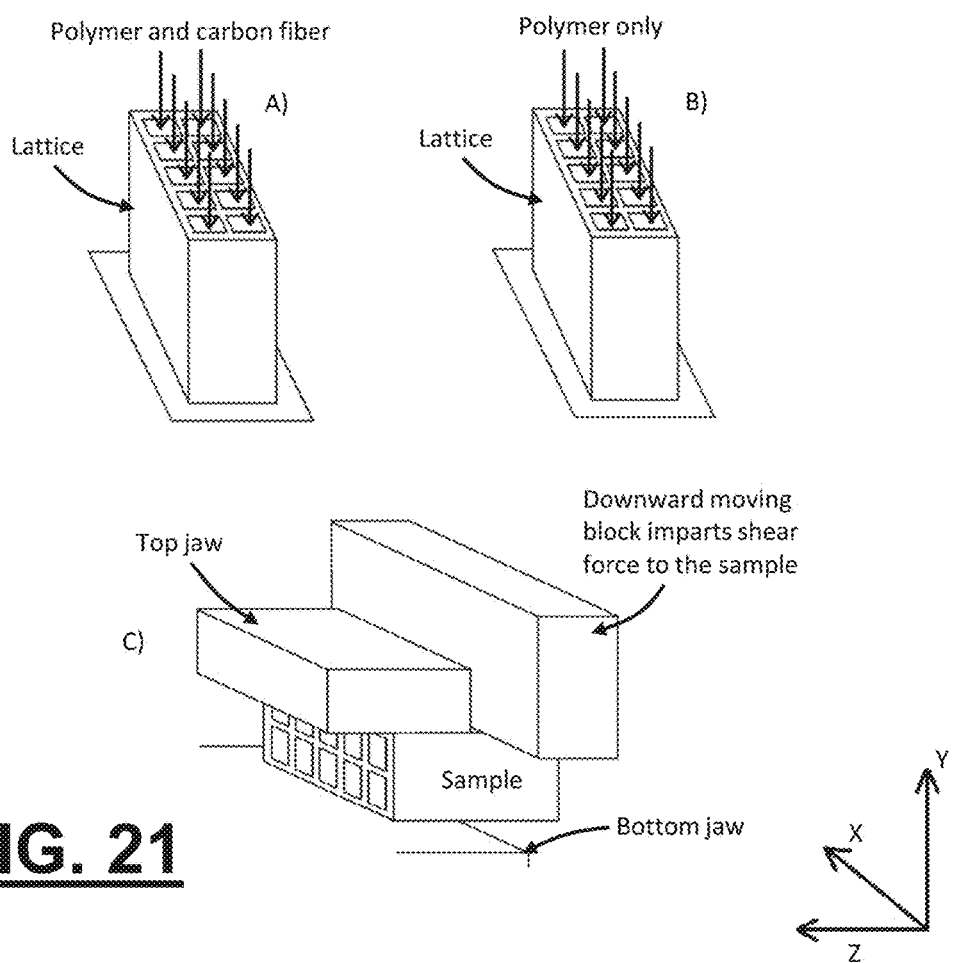
FIG. 21 illustrates fabrication and testing of 3D printed fiber reinforces articles.

Experimental FRP articles with 3D meshes were fabricated and tested as follows. Each test sample was first fabricated vertically in XY axis as an XY lattice structure formed from co-axial fibers (i.e., polymer coated reinforcing fibers). Some samples were fabricated with z-oriented reinforcing fibers via insertion of polymer-coated carbon fiber into the lattice holes and the residual spaces were filled with polymer (FIG. 21A). Some other samples were fabricated without z-oriented reinforcing fibers via insertion of polymer only into the lattice holes (FIG. 21B).

Figure 22:
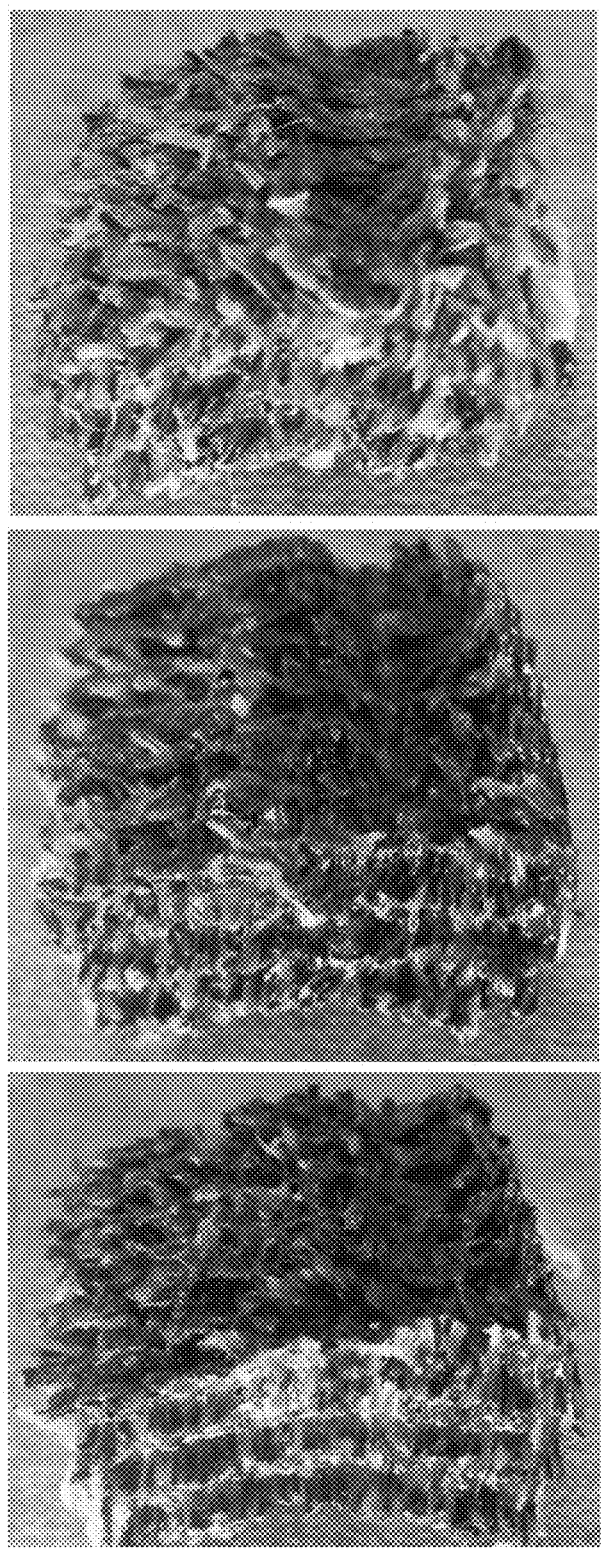
FIG. 22 includes photographs of tested samples that include z-oriented fibers.
Figure 23:
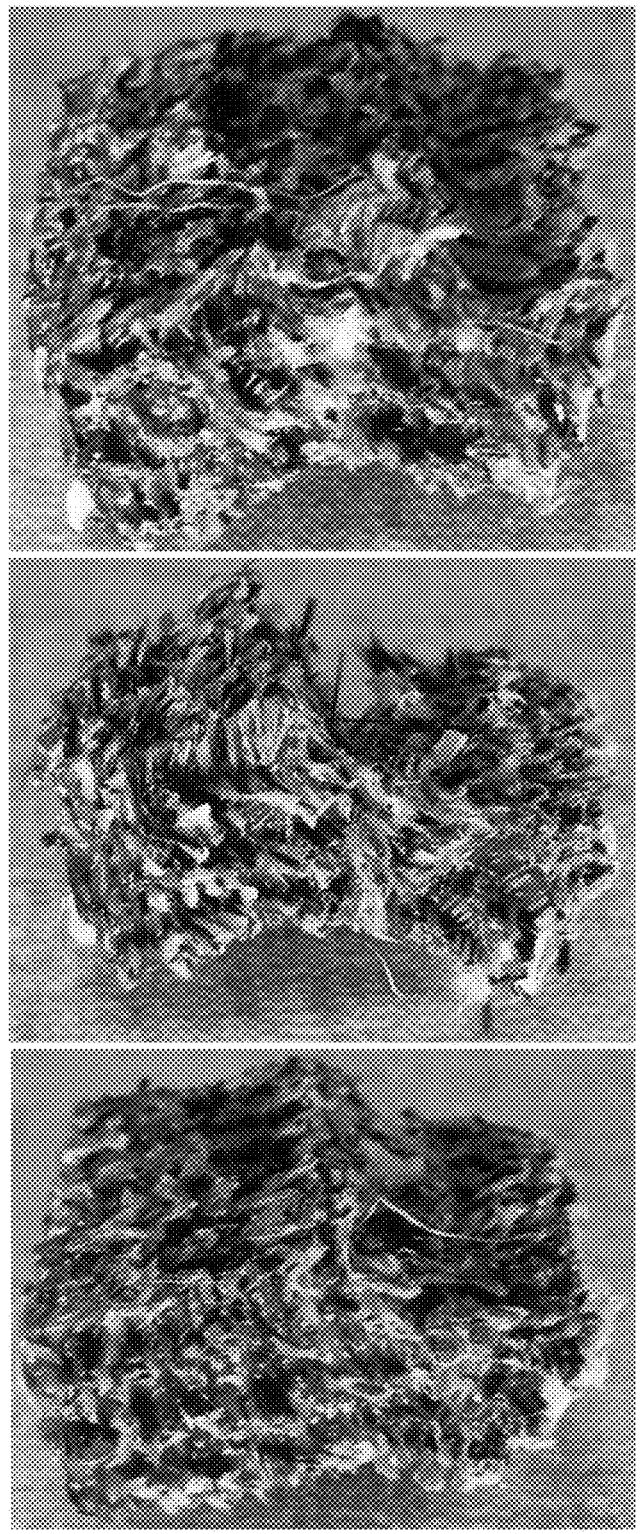
FIG. 23 includes photographs of tested samples that do not include z-oriented fibers.

The samples were then tested for shearing characteristics in the Z-axis (FIG. 21C). Each sample was clamped between two jaws with the clamping force applied perpendicular to the z-axis. Photographic images of the tested samples are shown in FIGS. 22 and 23. FIG. 22 includes photographic images of three different samples that include z-oriented reinforcing fibers, and FIG. 23 includes photographic images of three different samples that do not include z-oriented reinforcing fibers. While the samples with z-oriented fibers exhibited bending behavior, the individually deposited layers remained intact structurally, as shown in FIG. 22. The samples without z-oriented fibers all exhibit some form of layer failure in which the layers have been split open and/or severely misaligned. The average minimum force to bend the samples that include z-oriented reinforcing fibers was 234.3 N, and the average minimum force to bend the samples that did not include z-oriented reinforcing fibers was 167.6 N, representing about a 40% greater shear strength when z-oriented fibers were included.

Figure 24:
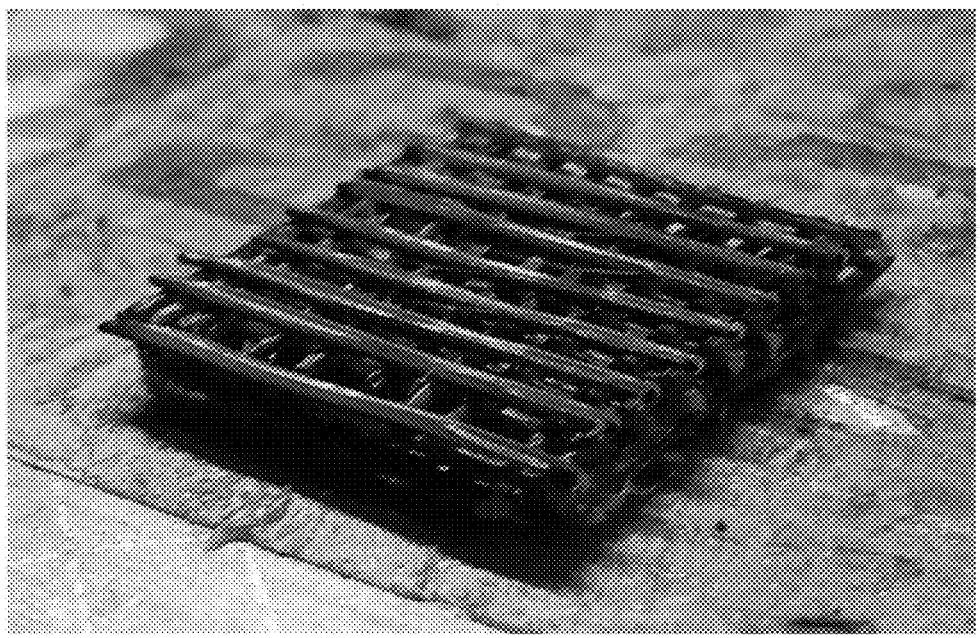
FIGS. 24 and 25 are photographic images of 3D printed lattice structures formed from co-axial fibers.
Figure 25:
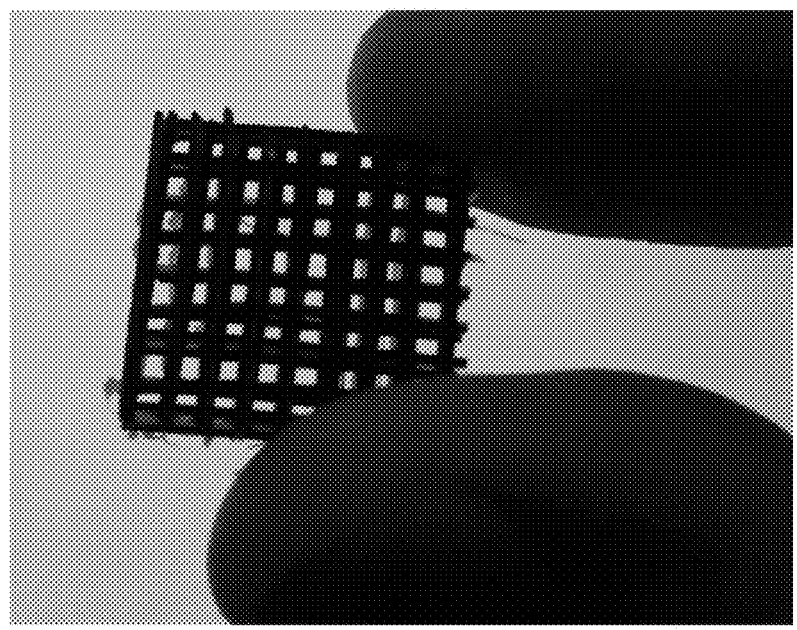

FIGS. 24 and 25 are photographic images of an XY lattice structure printed using co-axial fibers. The illustrated lattice structures are 16 mm×16 mm×2.5 mm, with each layer being 0.5 mm thick and with an average spacing of 2 mm between adjacent fibers that lie in the same orientation. These lattice structures are suitable for insertion of z-oriented fibers as described above.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A 3D printing system, comprising:
a print head comprising a nozzle from which a printable material comprising a polymer exits the print head for deposition on a printing surface; and
a heating element configured to heat the printable material to a transition temperature of the polymer such that the printable material adheres to the printing surface,
wherein the heating element is separate from and located away from the nozzle so that the transition temperature is not reached until after the printable material has emerged from and moved away from the nozzle.

2. The 3D printing system of claim 1, further comprising a feed system configured to feed the printable material through the print head and toward the printing surface, wherein the printable material is a strand of material and the feed system bends the strand of material toward a horizontal direction before the strand of material is heated by the heating element.

3. The 3D printing system of claim 1, further comprising a pressing element that moves toward the printing surface to press the heated material against the printing surface.

4. The 3D printing system of claim 3, wherein the pressing element includes the heating element.

5. The 3D printing system of claim 1, wherein the printable material comprises a coaxial fiber that includes the polymer as a coating.

6. The 3D printing system of claim 1, wherein the printable material is not heated until it reaches the heating element.

7. A 3D printing system, comprising:
a feed system configured to feed a strand of printable material through a print head and toward a printing surface; and a deposition system configured to heat the strand of material and place the heated strand of material on the printing surface, wherein the feed system bends the strand of material before the strand of material reaches the deposition system to be heated and placed on the printing surface.

8. The 3D printing system of claim 7, wherein the deposition system includes a heating element configured to heat the strand of material and the feed system includes a nozzle from which the strand of material exits the print head, the heating element being separate from and located away from the nozzle.

9. The 3D printing system of claim 7, wherein the deposition system comprises a pressing element that moves toward the printing surface to press the heated strand of material against the printing surface.

10. The 3D printing system of claim 9, wherein the pressing element includes a heating element that heats the strand of material while pressing the strand of material against the printing surface.

11. The 3D printing system of claim 7, wherein the strand of material comprises a polymer.

12. A 3D printing system, comprising:
a print head comprising a nozzle from which a printable material exits the print head for deposition on a printing surface; and
a deposition system configured to heat the printable material and place the heated material on the printing surface,
wherein the deposition system includes a pressing element that moves toward the printing surface to press the heated material against the printing surface.

13. The 3D printing system of claim 12, wherein the deposition system includes a heating element configured to heat the printable material, the heating element being separate from and located away from the nozzle.

14. The 3D printing system of claim 13, wherein the pressing element includes the heating element.

15. The 3D printing system of claim 12, further comprising a feed system configured to feed the printable material through the print head and toward the printing surface, wherein the printable material is a strand of material and the feed system bends the strand of material toward a horizontal direction before the strand of material is heated and pressed against the printing surface by the deposition system.

16. The 3D printing system of claim 12, wherein the deposition system is configured to move the pressing element in a rocking motion.

17. The 3D printing system of claim 12, wherein the printable material comprises a polymer.

18. The 3D printing system of claim 12, wherein the printable material comprises a coaxial fiber.

19. The 3D printing system of claim 12, further comprising a feed system configured to feed the printable material through the print head and toward the printing surface,
wherein the pressing element includes a heating element configured to heat the printable material, the heating element being separate from and located away from the nozzle, and
wherein the printable material is a strand of material and the feed system bends the strand of material toward a horizontal direction before the strand of material is heated and pressed against the printing surface by the pressing element.

20. The 3D printing system of claim 19, wherein the pressing element moves with a rocking motion.

* * * * *